(12) United States Patent
Fan et al.

(10) Patent No.: US 9,890,294 B2
(45) Date of Patent: Feb. 13, 2018

(54) COMPOSITION INCLUDING A FLUORINATED POLYMER AND A NON-FLUORINATED POLYMER AND METHODS OF MAKING AND USING THE SAME

(71) Applicant: 3M INNOVATIVE PROPERTIES COMPANY, St. Paul, MN (US)

(72) Inventors: Wayne W. Fan, Cottage Grove, MN (US); Dong-Wei Zhu, Shoreview, MN (US); Rudolf J. Dams, Antwerp (BE); Yong K. Wu, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/443,588

(22) PCT Filed: Nov. 19, 2013

(86) PCT No.: PCT/US2013/070665
§ 371 (c)(1),
(2) Date: May 18, 2015

(87) PCT Pub. No.: WO2014/078825
PCT Pub. Date: May 22, 2014

(65) Prior Publication Data
US 2015/0299506 A1 Oct. 22, 2015

Related U.S. Application Data
(60) Provisional application No. 61/727,877, filed on Nov. 19, 2012.

(51) Int. Cl.
| | | |
|---|---|---|
| *C09K 8/80* | (2006.01) | |
| *C09D 133/16* | (2006.01) | |
| *C08F 20/24* | (2006.01) | |
| *C08F 220/28* | (2006.01) | |
| *C08L 33/16* | (2006.01) | |
| *C08L 51/06* | (2006.01) | |
| *C09D 133/08* | (2006.01) | |
| *C09D 133/14* | (2006.01) | |

(52) U.S. Cl.
CPC ............ *C09D 133/16* (2013.01); *C08F 20/24* (2013.01); *C08F 220/28* (2013.01); *C08L 33/16* (2013.01); *C08L 51/06* (2013.01); *C09D 133/08* (2013.01); *C09D 133/14* (2013.01); *C09K 8/805* (2013.01)

(58) Field of Classification Search
CPC .......... C09K 8/80; C09K 8/602; C09K 8/584; C09K 8/604; C09K 8/88; C09K 8/885; C09K 8/588; C09K 8/68; C09K 8/86; C09K 8/035; C09K 8/5751; C09K 8/62; C09K 2003/1053; C09K 3/1009; C09K 8/04; C09K 8/506; C09K 8/516; C09K 8/565; C09K 8/57; C09K 8/575; C09K 8/58; C09K 8/60; C09K 8/805; C09K 8/50; E21B 43/16; E21B 43/25; E21B 43/26
See application file for complete search history.

(56) References Cited

U.S. PATENT DOCUMENTS

| | | | | |
|---|---|---|---|---|
| 2,737,458 | A | * 3/1956 | Burnham | D06M 13/02 106/162.8 |
| 2,803,615 | A | 8/1957 | Ahlbrecht | |
| 3,068,187 | A | * 12/1962 | Bolstad | C08F 2/00 428/422 |
| 3,278,352 | A | 10/1966 | Erickson | |
| 3,311,167 | A | 3/1967 | O'Brien | |
| 3,394,758 | A | 7/1968 | Terry | |
| 3,553,179 | A | 1/1971 | Bartlett | |
| 3,653,442 | A | 4/1972 | Ross | |
| 3,728,151 | A | 4/1973 | Sherman | |
| 3,787,351 | A | 1/1974 | Olson | |
| 3,902,557 | A | 9/1975 | Shaughnessy | |
| 3,944,527 | A | 3/1976 | McCown | |
| 4,018,689 | A | 4/1977 | Thompson | |
| 4,147,851 | A | 4/1979 | Raynolds | |
| 4,200,154 | A | 4/1980 | Tate | |
| 4,329,236 | A | 5/1982 | Alford | |
| 4,432,882 | A | 2/1984 | Raynolds et al. | |

(Continued)

FOREIGN PATENT DOCUMENTS

| | | |
|---|---|---|
| CA | 2009732 | 8/1990 |
| EP | 0870778 | 10/1998 |

(Continued)

OTHER PUBLICATIONS

US 6,492,477, 12/2002, Savu (withdrawn)
L. Lilletvedt et al. Solubilization of the novel anionic amphiphilic photosensitizer TPCS2a by nonionic Pluronic block copolymers, European Journal of Pharmaceutical Sciences 43 (2011) 180-187.*
Advances in radiation chemistry of polymers Proceedings of a technical meeting held in Notre Dame, Indiana, USA Sep. 13-17, 2003.*
https://scifinder.cas.org/scifinder/view/substance/substanceDetail.jsf?nav=eNpb85aBtYS... downloaded on Oct. 16, 2016.*

(Continued)

*Primary Examiner* — Kumar R Bhushan

(57) ABSTRACT

A composition is disclosed that includes fluorinated polymer and a non-fluorinated polymer. The fluorinated polymer includes first divalent units independently represented by formula and second divalent unit independently comprising a pendent cationic, anionic, amphoteric, or amine-oxide group or a pendent poly(alkyleneoxy) segment. The non-fluorinated polymer is $R^2O\text{-}(EO)_p\text{—}(R^3O)_q\text{-}(EO)_p\text{—}R^2$ or $R^2O\text{—}(R^3O)_q\text{-}(EO)_p\text{—}(R^3O)_q\text{—}R^2$. A method of making the composition and methods of reducing the surface tension of a liquid and a method of treating a hydrocarbon-bearing formation are also disclosed.

20 Claims, 1 Drawing Sheet

(56) References Cited

U.S. PATENT DOCUMENTS

| | | | |
|---|---|---|---|
| 4,440,653 A | 4/1984 | Briscoe et al. | |
| 4,460,791 A | 7/1984 | Cooke | |
| 4,557,837 A | 12/1985 | Clark, III et al. | |
| 4,565,639 A | 1/1986 | Penny et al. | |
| 4,594,200 A | 6/1986 | Penny | |
| 4,609,477 A | 9/1986 | Crema | |
| 4,702,849 A | 10/1987 | Penny | |
| 4,753,740 A | 6/1988 | Marlett et al. | |
| 4,767,545 A | 8/1988 | Karydas et al. | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,993,448 A | 2/1991 | Karydas et al. | |
| 4,997,580 A | 3/1991 | Karydas et al. | |
| 5,042,580 A | 8/1991 | Cullick et al. | |
| 5,092,405 A | 3/1992 | Prukop | |
| 5,129,457 A | 7/1992 | Sydansk | |
| 5,144,069 A | 9/1992 | Stern | |
| 5,186,257 A | 2/1993 | Stahl et al. | |
| 5,247,993 A | 9/1993 | Sarem et al. | |
| 5,310,002 A | 5/1994 | Blauch et al. | |
| 5,358,052 A | 10/1994 | Gidley | |
| 5,370,919 A * | 12/1994 | Fieuws | C04B 41/009 |
| | | | 106/2 |
| 5,468,353 A | 11/1995 | Anich | |
| 5,688,884 A | 11/1997 | Baker | |
| 6,165,948 A | 12/2000 | Dewenter et al. | |
| 6,182,759 B1 | 2/2001 | Burger | |
| 6,206,102 B1 | 3/2001 | Pusch et al. | |
| 6,225,263 B1 | 5/2001 | Collins et al. | |
| 6,380,149 B2 | 4/2002 | Flynn | |
| 6,579,572 B2 | 6/2003 | Espin et al. | |
| 6,660,693 B2 | 12/2003 | Miller et al. | |
| 6,664,354 B2 | 12/2003 | Savu et al. | |
| 6,689,854 B2 | 2/2004 | Fan et al. | |
| 6,729,409 B1 | 5/2004 | Gupta et al. | |
| 6,852,781 B2 | 2/2005 | Savu | |
| 6,911,417 B2 | 6/2005 | Chan et al. | |
| 6,945,327 B2 | 9/2005 | Ely et al. | |
| 6,972,274 B1 | 12/2005 | Slikta et al. | |
| 7,084,094 B2 | 8/2006 | Gunn et al. | |
| 7,165,613 B2 | 1/2007 | Chan et al. | |
| 7,417,099 B2 | 8/2008 | Savu et al. | |
| 7,585,817 B2 | 9/2009 | Pope et al. | |
| 7,629,298 B2 | 12/2009 | Arco et al. | |
| 7,722,955 B2 | 5/2010 | Audenaert | |
| 7,772,162 B2 | 8/2010 | Pope et al. | |
| 7,855,169 B2 | 12/2010 | Pope et al. | |
| 8,043,998 B2 | 10/2011 | Pope et al. | |
| 8,138,127 B2 | 3/2012 | Pope et al. | |
| 8,176,981 B2 | 5/2012 | Savu | |
| 8,236,737 B2 | 8/2012 | Fan | |
| 8,261,825 B2 | 9/2012 | Pope et al. | |
| 8,403,050 B2 | 3/2013 | Pope et al. | |
| 8,418,759 B2 | 4/2013 | Moore | |
| 8,629,089 B2 | 1/2014 | Dams | |
| 8,678,090 B2 | 3/2014 | Baran, Jr. | |
| 8,701,763 B2 | 4/2014 | Baran, Jr. | |
| 9,057,012 B2 | 6/2015 | Dams | |
| 2003/0083396 A1* | 5/2003 | Ylitalo | C09D 11/101 |
| | | | 522/74 |
| 2003/0092581 A1 | 5/2003 | Crews | |
| 2005/0244641 A1 | 11/2005 | Vincent | |
| 2006/0045979 A1 | 3/2006 | Dams | |
| 2006/0149012 A1 | 7/2006 | Terrazas | |
| 2006/0264334 A1 | 11/2006 | Gupta et al. | |
| 2007/0015669 A1 | 1/2007 | Zhang | |
| 2007/0029085 A1 | 2/2007 | Panga et al. | |
| 2008/0051300 A1* | 2/2008 | Pope | C09K 8/52 |
| | | | 507/226 |
| 2009/0149616 A1 | 6/2009 | Audenaert | |
| 2009/0281002 A1 | 11/2009 | Casper | |
| 2010/0041819 A1* | 2/2010 | Moore | C08F 220/38 |
| | | | 524/538 |
| 2010/0152071 A1 | 6/2010 | Pope et al. | |
| 2010/0179262 A1 | 7/2010 | Dams | |
| 2010/0181068 A1 | 7/2010 | Pope et al. | |
| 2010/0224361 A1 | 9/2010 | Pope et al. | |
| 2010/0270019 A1 | 10/2010 | Pope et al. | |
| 2010/0270020 A1 | 10/2010 | Baran, Jr. | |
| 2010/0276142 A1 | 11/2010 | Skildum et al. | |
| 2011/0056689 A1 | 3/2011 | Baran, Jr. | |
| 2011/0124532 A1 | 5/2011 | Maurer | |
| 2011/0136704 A1 | 6/2011 | Sharma | |
| 2011/0177983 A1 | 7/2011 | Baran, Jr. | |
| 2011/0201531 A1 | 8/2011 | Sharma | |
| 2011/0247823 A1* | 10/2011 | Dams | C09K 8/584 |
| | | | 166/305.1 |
| 2012/0071372 A1 | 3/2012 | Iaconelli | |
| 2012/0097393 A1 | 4/2012 | Dams | |
| 2013/0264061 A1 | 10/2013 | Baran, Jr. | |
| 2013/0269932 A1 | 10/2013 | Dams | |
| 2014/0014330 A1 | 1/2014 | Dams | |
| 2015/0329766 A1 | 11/2015 | Dams | |

FOREIGN PATENT DOCUMENTS

| | | |
|---|---|---|
| EP | 1311637 | 5/2003 |
| GB | 2031482 | 4/1980 |
| JP | 2014-051863 | 3/2014 |
| SU | 1706204 | 11/1994 |
| WO | WO 2003/089540 | 10/2003 |
| WO | WO 2005/028589 A1 | 3/2005 |
| WO | WO 2005/035936 A1 | 4/2005 |
| WO | WO 2007/017806 | 2/2007 |
| WO | WO 2007/033489 | 3/2007 |
| WO | WO 2007/097975 | 8/2007 |
| WO | WO 2010-088056 | 8/2010 |
| WO | WO 2010/132333 | 11/2010 |
| WO | WO 2010/132362 | 11/2010 |
| WO | WO 2010/144352 | 12/2010 |
| WO | WO 2010/144398 | 12/2010 |
| WO | WO 2011/005666 | 1/2011 |
| WO | WO 2011-120735 | 10/2011 |
| WO | WO2012/088216 * | 6/2012 |
| WO | WO 2012-125219 | 9/2012 |

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236. (XP002519991).

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Kumar, "Improving the Gas and Condensate Relative Permeability Using Chemical Treatments", May 15-17, 2006, SPE Gas Technology Symposium, Calgary, Alberta, pp. 1-9. SPE 100529.

Mcleod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir Rock", Project 3-Gas Condensate Reservoirs Part 2, Reservoir Engineering Research Institute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

(56) References Cited

OTHER PUBLICATIONS

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.
Karsa, "Industrial Applications Of Surfactants", 4 Pages, 1987.
Banks, "Organofluorine Chemicals and Their Industrial Applications", pp. 226-234, 1979.
International Search Report for PCT International Application No. PCT/US2013/070665 dated Mar. 13, 2014, 3 pages.

* cited by examiner

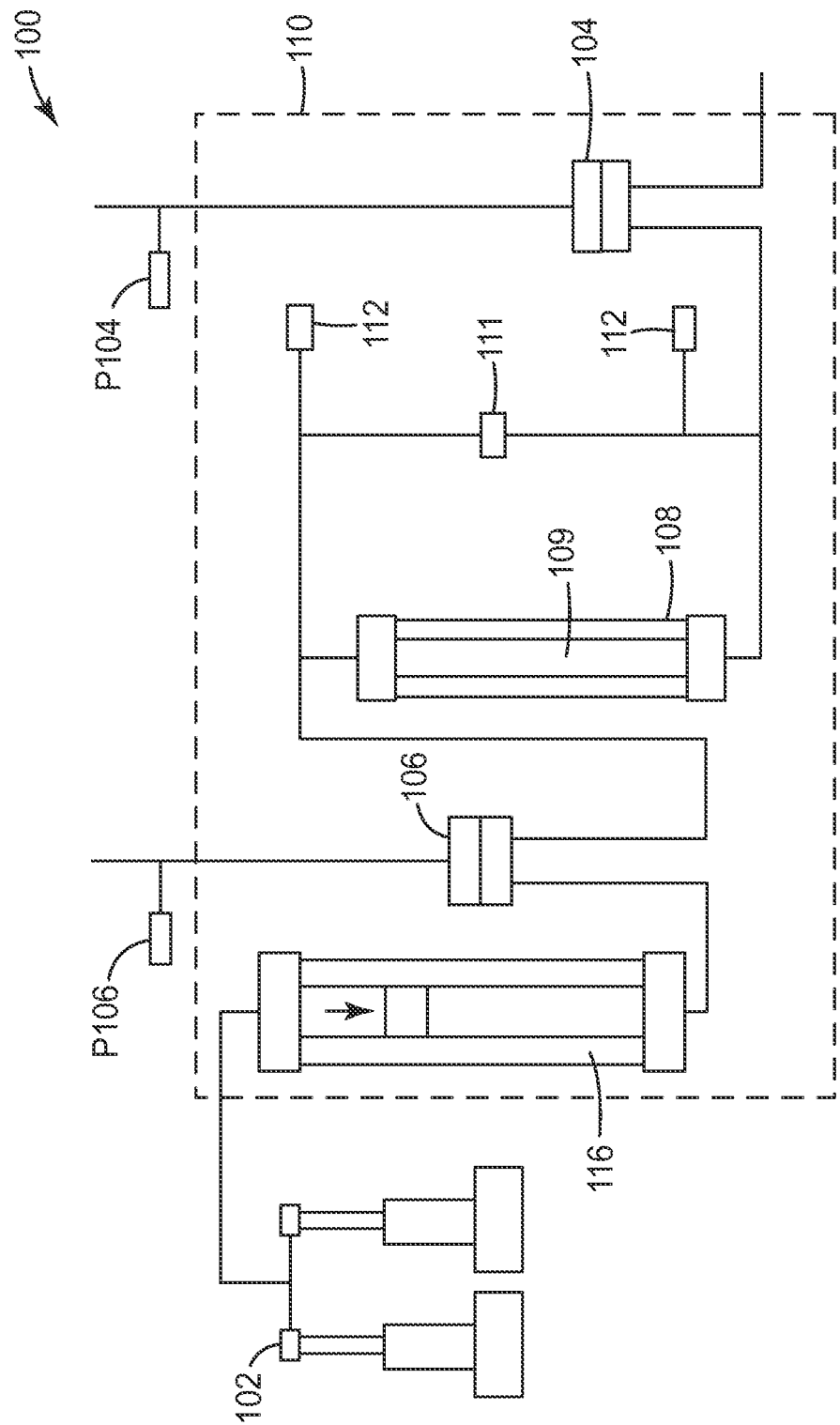

US 9,890,294 B2

COMPOSITION INCLUDING A FLUORINATED POLYMER AND A NON-FLUORINATED POLYMER AND METHODS OF MAKING AND USING THE SAME

CROSS REFERENCE TO RELATED APPLICATION

This application is a national stage filing under 35 U.S.C. 371 of PCT/US2013/070665, filed Nov. 19, 2013, which claims priority to U.S. Provisional Application No. 61/727,877, filed Nov. 19, 2012, the disclosure of which is incorporated by reference in its entirety herein.

BACKGROUND

Fluorinated surfactants have been widely used in industrial coatings and other applications for many years. Fluorinated surfactants can be useful, for example, for lowering the surface tension of a formulation, changing wetting behavior, providing leveling properties, and providing storage stability (e.g., with respect to phase separation). The particular properties affected depend, for example, on the particular composition of each surfactant and the particular formulation in which it is used. Traditionally many widely used fluorinated surfactants included long-chain perfluoroalkyl groups, for example, perfluorooctyl groups. Recently, however, other types of fluorinated compounds that can be useful as surfactants have been developed. These include fluorinated polymers such as those described in U.S. Pat. No. 6,664,354 (Savu et al.) and U.S. Pat. Appl. Pub. No. 2009/0149616 (Audenaert et al.), 2010/0179262 (Dams et al.). In the oil and gas industry, some of such polymers have been found useful for modifying the wettability of reservoir rock. See, e.g., U.S. Pat. No. 7,585,817 (Pope et al.) and U.S. Pat. Appl. Pub. No. 2011/0247822 (Dams).

SUMMARY

The present disclosure provides a composition that includes a fluorinated polymer and a non-fluorinated polymer, the preparation of such compounds, and methods of using them, for example, to reduce the surface tension of a liquid or to increase permeability in hydrocarbon-bearing formations in which two phases (i.e., a gas phase and an oil phase) of the hydrocarbons are present or when the hydrocarbon-bearing formation has brine.

In many embodiments, the fluorinated polymer and the non-fluorinated polymer form a homogeneous solution, even in the absence of added organic solvent. Advantageously, the composition can be prepared by making the fluorinated polymer in the non-fluorinated polymer in the absence of added volatile organic solvent. The fluorinated polymer and the non-fluorinated polymer can both serve to lower the surface tension of a liquid, which typically results in excellent surface tension reduction. The composition disclosed herein includes a non-fluorinated polymer, but it typically provides surface tension reduction that may be expected from compositions including a larger amount of fluorogroups. Thus the composition disclosed herein can be considered to have a high fluorine efficiency, which may provide advantages, for example, in manufacturing cost.

In one aspect, the present disclosure provides a composition including a fluorinated polymer and a non-fluorinated polymer. The fluorinated polymer includes first divalent units independently represented by formula:

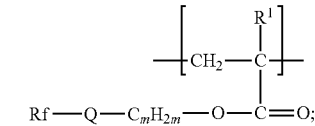

and second divalent units independently comprising a pendent cationic, anionic, amphoteric, or amine oxide group or a pendent poly(alkyleneoxy) segment, wherein the second divalent units are present in the fluorinated polymer in an amount such that the fluorinated polymer and non-fluorinated polymer form a solution or dispersion; wherein Rf represents a fluoroalkyl group having from 1 to 8 carbon atoms or Rf represents a polyfluoroether group; $R^1$ is hydrogen or methyl; Q is a bond, —$SO_2$—N(R)—, or —C(O)—N(R)—, wherein R is alkyl having from 1 to 4 carbon atoms or hydrogen; and m is an integer from 1 to 11. The non-fluorinated polymer is $R^2O\text{-}(EO)_p$—$(R^3O)_q$-$(EO)_p$—$R^2$ or $R^2O$—$(R^3O)_q$-$(EO)_p$—$(R^3O)_q$—$R^2$, wherein $R^2$ is hydrogen or alkyl having from 1 to 4 carbon atoms; EO represents —$CH_2CH_2O$—; each $R^3O$ is independently selected from the group consisting of —$CH(CH_3)CH_2O$—, —$CH_2CH_2CH_2O$—, —$CH_2CH(CH_3)O$—, —$CH_2CH_2CH_2CH_2O$—, —$CH(CH_2CH_3)CH_2O$—, —$CH_2CH(CH_2CH_3)O$—, and —$CH_2C(CH_3)_2O$—; each p is independently 0 to 150; and each q is independently 0 to 150, wherein p+q is at least 5. The fluorinated polymer has not more than 2.5 percent by weight units represented by formula:

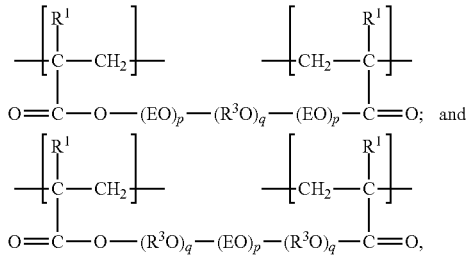

based on the total weight of the fluorinated polymer, wherein $R^1$ is hydrogen or methyl and EO, $R^3O$, p, and q are as defined in the non-fluorinated polymer. The fluorinated polymer may include more than one type of second divalent unit in any combination.

In another aspect, the present disclosure provides a method of making a composition. The method includes combining components including a fluorinated monomer represented by formula Rf-Q-$C_mH_{2m}$—O—C(O)—C($R^1$)=$CH_2$, a second monomer having a pendent cationic, anionic, amphoteric, or amine-oxide group or a pendent poly(alkyleneoxy) segment, a non-fluorinated polymer represented by formula $R^2O\text{-}(EO)_p$—$(R^3O)_q$-$(EO)_p$—$R^2$ or $R^2O$—$(R^3O)_q$-$(EO)_p$—$(R^3O)_q$—$R^2$, and a free-radical initiator and copolymerizing the fluorinated monomer and the second monomer. In the fluorinated monomer and the non-fluorinated polymer, Rf represents a fluoroalkyl group having from 1 to 8 carbon atoms or Rf represents a polyfluoroether group; $R^1$ is hydrogen or methyl; Q is a bond, —$SO_2$—N(R)—, or —C(O)—N(R)—, wherein R is alkyl having from 1 to 4 carbon atoms or hydrogen; m is an integer from 1 to 11; EO represents —$CH_2CH_2O$—; each $R^3O$ is independently selected from the group consisting of —CH(CH$_3$)CH$_2$O—, —CH$_2$CH$_2$CH$_2$O—, —CH$_2$CH(CH$_3$)O—, —CH$_2$CH$_2$CH$_2$CH$_2$O—, —CH(CH$_2$CH$_3$)CH$_2$O—, —CH$_2$CH(CH$_2$CH$_3$)O—, and —CH$_2$C(CH$_3$)$_2$O—; each p is independently 0 to 150; and each q is independently 0 to 150, wherein p+q is at least 5, and R$^2$ is hydrogen or alkyl having from 1 to 4 carbon atoms. The second monomer is present in the components in an amount sufficient such that the fluorinated polymer and the non-fluorinated polymer form a solution or dispersion. The components comprise not more than 2.5 percent by weight of a monomer represented by formula CH$_2$=C(R$^2$)—C(O)—O-(EO)$_p$—(R$^3$O)$_q$-(EO)$_p$—C(O)—C(R$^1$)=CH$_2$ or CH$_2$=C(R$^2$)—C(O)—O—(R$^3$O)$_q$-(EO)$_p$—(R$^3$O)$_q$—C(O)—C(R$^2$)=CH$_2$, based on the total weight of the monomers. The method can advantageously be carried out in the absence of volatile organic solvent. The components can include more than one fluorinated monomer and more than one second monomer.

In another aspect, the present disclosure provides a method of reducing the surface tension of a liquid, the method comprising combining the liquid with the composition according to and/or made according to the method of the present disclosure to reduce the surface tension of the liquid.

In another aspect, the present disclosure provides a method of treating a hydrocarbon-bearing formation, the method comprising contacting the hydrocarbon-bearing formation with a treatment composition comprising solvent and the composition according to and/or made according to the present disclosure.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "contacting" includes placing a treatment composition within a hydrocarbon-bearing formation using any suitable manner known in the art (e.g., pumping, injecting, pouring, releasing, displacing, spotting, or circulating the treatment composition into a well, wellbore, or hydrocarbon-bearing formation).

The term "solvent" refers to a homogeneous liquid material (inclusive of any water with which it may be combined) that is capable of at least partially dissolving the fluorinated polymer disclosed herein at 25° C. The term "solvent" also includes mixtures of two or more organic solvents.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The phrase "interrupted by at least one functional group", for example, with regard to an alkyl (which may or may not be fluorinated), alkylene, or arylalkylene refers to having part of the alkyl, alkylene, or arylalkylene on both sides of the functional group.

The term "polymer" refers to a molecule having a structure which essentially includes the multiple repetition of units derived, actually or conceptually, from molecules of low relative molecular mass. The term "polymer" encompasses oligomers.

The term "fluoroalkyl group" includes linear, branched, and/or cyclic alkyl groups in which all C—H bonds are replaced by C—F bonds as well as groups in which hydrogen or chlorine atoms are present instead of fluorine atoms. In some embodiments, up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

The term "solution" refers to a homogeneous mixture.

The term "dispersion" refers to a mixture in which small particles of one component are dispersed in another component and do not settle out, for example, for at least an hour, a day, a week, or more than an hour, a day, or a week. That is, the dispersion may be called a stable dispersion in any of the embodiments of the composition or method of making the composition disclosed herein. When the small particles that are dispersed are small liquid droplets and the component in which they are dispersed is also a liquid, the dispersion may also be called an emulsion. The dispersion or emulsion may be a colloidal dispersion, in which the dispersed particles or droplets are in a size range from one nanometer to one micrometer.

The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)).

The region near the wellbore (i.e., near wellbore region) includes a region within about 25 feet (in some embodiments, 20, 15, or 10 feet) of the wellbore.

All numerical ranges are inclusive of their endpoints and nonintegral values between the endpoints unless otherwise stated.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

BRIEF DESCRIPTION OF THE DRAWING

FIG. 1 is a schematic illustration of the core flood set-up used for the core flood evaluation described in the Examples.

DETAILED DESCRIPTION

In some embodiments of compositions according to and/or made according to the present disclosure, the fluorinated polymer comprises (e.g., at least 2, 3, 4, 5, 6, 7, 8, 9, 10, 15, or at least 20 up to 30, 35, 40, 45, 50, 100, or up to 200) first divalent units independently represented by formula:

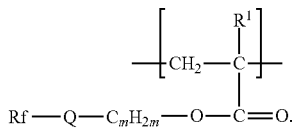

For divalent units having this formula, Q is a bond, —SO$_2$N(R)—, or —C(O)—N(R)— wherein R is alkyl having 1 to 4 carbon atoms (e.g., methyl, ethyl, n-propyl, isopropyl, n-butyl, or isobutyl) or hydrogen. In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the first divalent units may also be represented by formula:

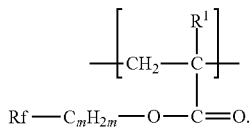

In some embodiments, fluorinated polymers in compositions according to and/or made according to the method of the present disclosure comprise (e.g., at least 2, 3, 4, 5, 6, 7, 8, 9, 10, 15, or at least 20 up to 30, 35, 40, 45, 50, 100, or up to 200) first divalent units independently represented by formula:

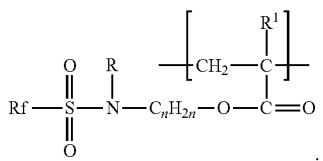

For divalent units of this formula, n is an integer from 2 to 11 (i.e., 2, 3, 4, 5, 6, 7, 8, 9, 10, or 11). In some embodiments, n is an integer from 2 to 6 or 2 to 4. R is alkyl having 1 to 4 carbon atoms (e.g., methyl, ethyl, n-propyl, isopropyl, n-butyl, or isobutyl). In some embodiments, R is methyl or ethyl.

For any of the embodiments of the first divalent units having Rf groups, each Rf independently represents a fluorinated alkyl group having from 1 to 8 (in some embodiments, 1 to 6, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, perfluoroisopentyl, perfluorohexyl, perfluoroheptyl, or perfluorooctyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl or perfluoroisopropyl). The fluorinated polymer may include a mixture of fluorinated monomers having different Rf fluoroalkyl groups (e.g., with an average of up to 6 or 4 carbon atoms).

In some embodiments, Rf is a polyfluoroether group. The term "polyfluoroether" refers to a compound or group having at least 3 (in some embodiments, at least 4, 5, 6, 7, 8, 9, 10, 11, 12, 13, 14, 15, 16, 17, 18, 19, or even 20) carbon atoms and at least 1 (in some embodiments, at least 2, 3, 4, 5, 6, 7, or even 8) ether linkages, wherein hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

In some embodiments, including embodiments wherein Rf is a polyfluoroether group, fluorinated polymers in compositions according to and/or made according to the present disclosure comprise (e.g., at least 2, 3, 4, 5, 6, 7, 8, 9, 10, 15, or at least 20 up to 30, 35, 40, 45, 50, 100, or up to 200) first divalent units independently represented by formula:

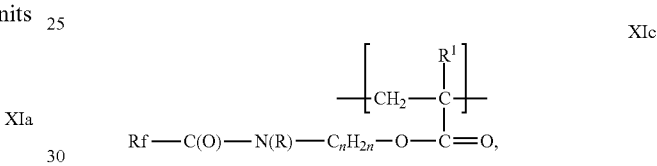

For divalent units of this formula, n is an integer from 2 to 11 (i.e., 2, 3, 4, 5, 6, 7, 8, 9, 10, or 11). In some embodiments, n is an integer from 2 to 6 or 2 to 4. R is alkyl having 1 to 4 carbon atoms (e.g., methyl, ethyl, n-propyl, isopropyl, n-butyl, or isobutyl) or hydrogen. In some embodiments, R is methyl or ethyl.

The polyfluoroether group Rf can be linear, branched, cyclic, or combinations thereof and can be saturated or unsaturated. Polyfluoroether groups include those in which hydrogen or chlorine atoms are present instead of fluorine atoms with typically up to one atom of either hydrogen or chlorine is present for every two carbon atoms. The fluorinated polymer may include a mixture of fluorinated monomers having different Rf polyfluoroether groups. In some embodiments, the polyfluoroether group is a perfluoropolyether group (i.e., all of the hydrogen atoms on the carbon atoms are replaced with fluorine atoms). Exemplary perfluoropolyethers include perfluorinated repeating units represented by at least one of —(C$_d$F$_{2d}$)—, —(C$_d$F$_{2d}$O)—, —(CF(L'))-, —(CF(L')O)—, —(CF(L')C$_d$F$_{2d}$O)—, —(C$_d$F$_{2d}$CF(L')O)—, or —(CF$_2$CF(L')O)—. In these repeating units, d is typically an integer of 1 to 10. In some embodiments, d is an integer of 1 to 8, 1 to 6, 1 to 4, or 1 to 3. The L' group can be a perfluoroalkyl group optionally interrupted by at least one ether linkage or a perfluoroalkoxy group, each of which may be linear, branched, cyclic, or a combination thereof. The L' group typically has up to 12 (in some embodiments, up to 10, 8, 6, 4, 3, 2, or 1) carbon atoms. In some embodiments, the L' group can have up to 4 (in some embodiments, up to 3, 2, or 1) oxygen atoms; in some embodiments L' has no oxygen atoms. In these perfluoropolyether structures, different repeating units can be combined in a block or random arrangement to form the Rf group.

In some embodiments, Rf is represented by formula $R_f^a$—O—($R_f^b$—O—)$_z$($R_f^c$)—, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z' is in a range from 2 to 50 (in some embodiments, 2 to 25, 2 to 20, 3 to 20, 3 to 15, 5 to 15, 6 to 10, or 6 to 8). Representative $R_f^a$ groups include $CF_3$—, $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, and $CF_3CF(CF_3)CF_2CF_2$—. In some embodiments, $R_f^a$ is $CF_3CF_2CF_2$—. Representative $R_f^b$ groups include —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, and —$CF_2C(CF_3)_2$—. Representative $R_f^c$ groups include —$CF_2$—, —$CF(CF_3)$—, —$CF_2CF_2$—, —$CF_2CF_2CF_2$—, and —$CF(CF_3)CF_2$—. In some embodiments, $R_f^c$ is —$CF(CF_3)$—.

In some embodiments, $(R_f^b—O—)_{z'}$ is represented by —$[CF_2O]_i[CF_2CF_2O]_j$—, —$[CF_2O]_i[CF(CF_3)CF_2O]_j$—, —$[CF_2O]_i[CF_2CF_2CF_2O]_j$—, —$[CF_2CF_2O]_i[CF_2O]_j$—, —$[CF_2CF_2O]_i[CF(CF_3)CF_2O]_j$—, —$[CF_2CF_2O]_i[CF_2CF_2CF_2O]_j$—, —$[CF_2CF_2CF_2O]_i[CF_2CF(CF_3)O]_j$—, and $[CF_2CF_2CF_2O]_i[CF(CF_3)CF_2O]_j$—, wherein i+j is an integer of at least 3 (in some embodiments, at least 4, 5, or 6).

In some embodiments, Rf is selected from the group consisting of $C_3F_7O(CF(CF_3)CF_2O)_xCF(CF_3)$—, $C_3F_7O(CF_2CF_2CF_2O)_xCF_2CF_2$—, or $CF_3O(C_2F_4O)_yCF_2$—, wherein x has an average value in a range from 3 to 50 (in some embodiments, 3 to 25, 3 to 15, 3 to 10, 4 to 10, or 4 to 7), and wherein y has an average value in a range from 6 to 50 (in some embodiments, 6 to 25, 6 to 15, 6 to 10, 7 to 10, or 8 to 10). In some of these embodiments, Rf is $C_3F_7O(CF(CF_3)CF_2O)_xCF(CF_3)$—, wherein x has an average value in a range from 4 to 7. In some embodiments, Rf is selected from the group consisting of $CF_3O(CF_2O)_{x'}(C_2F_4O)_{y'}CF_2$— and $F(CF_2)_3—O—(C_4F_8O)_{z''}(CF_2)_3$—, wherein x', y', and z'' each independently has an average value in a range from 3 to 50 (in some embodiments, 3 to 25, 3 to 15, 3 to 10, or even 4 to 10).

In some embodiments, Rf is a polyfluoropolyether group that has a weight average molecular weight of at least 750 (in some embodiments at least 850 or even 1000) grams per mole. In some embodiments, Rf has a weight average molecular weight of up to 6000 (in some embodiments, 5000 or even 4000) grams per mole. In some embodiments, Rf has a weight average molecular weight in a range from 750 grams per mole to 5000 grams per mole. Weight average molecular weights can be measured, for example, by gel permeation chromatography (i.e., size exclusion chromatography) using techniques known in the art.

In some embodiments, Rf is selected from the group consisting of:

$Rf^d—(O)_r—CHF—(CF_2)_n$—;

$[Rf^e—(O)_t—C(L)H—CF_2—O]_m—W'$—;

$CF_3CFH—O—(CF_2)_p$—;

$CF_3—(O—CF_2)_z$—; and $CF_3—O—(CF_2)_3—O—CF_2$—;

wherein
$Rf^d$ and $Rf^e$ independently represent a partially or fully fluorinated alkyl group having from 1 to 10 carbon atoms and optionally interrupted with at least one oxygen atom;

L is selected from the group consisting of F and $CF_3$;
W' is selected from the group consisting of alkylene and arylene;
r is 0 or 1, wherein when r is 0, then $Rf^d$ is interrupted with at least one oxygen atom;
t is 0 or 1;
m is 1, 2, or 3;
n is 0 or 1;
each p is independently a number from 1 to 6; and
z is a number from 2 to 7.

In some of these embodiments, Rf has a molecular weight of up to 600 grams per mole (in some embodiments, up to 500, 400, or even up to 300 grams per mole). $Rf^d$ and $Rf^e$ independently represent a partially or fully fluorinated alkyl group having from 1 to 10 carbon atoms and optionally interrupted with at least one oxygen atom. $Rf^d$ and $Rf^e$ include linear and branched alkyl groups. In some embodiments, $Rf^d$ and/or $Rf^e$ is linear. In some embodiments, $Rf^d$ and $Rf^e$ independently represent a fully fluorinated alkyl group having up to 6 (in some embodiments, 5, 4, 3, 2, or 1) carbon atoms. In some embodiments, $Rf^d$ and $Rf^e$ independently represent a fully fluorinated alkyl group interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms. In some embodiments, $Rf^d$ and $Rf^e$ independently represent a partially fluorinated alkyl group having up to 6 (in some embodiments, 5, 4, 3, 2, or 1) carbon atoms and up to 2 hydrogen atoms. In some embodiments, $Rf^d$ and $Rf^e$ independently represent a partially fluorinated alkyl group having up 2 hydrogen atoms and interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms.

In some embodiments of Rf, $Rf^d$ and $Rf^e$ are independently represented by formula $R_f^1—[OR_f^2]_a—[OR_f^3]_b$—.

$R_f^1$ is a perfluorinated alkyl group having from 1 to 6 (in some embodiments, 1 to 4) carbon atoms. $R_f^2$ and $R_f^3$ are each independently perfluorinated alkylene having from 1 to 4 carbon atoms. "a" and b are each independently a number having a value from 0 to 4, and the sum of "a" and b is at least 1. In some of these embodiments, t is 1, and r is 1.

In some embodiments of Rf, $Rf^d$ and $Rf^e$ are independently represented by formula $R_f^4—[OR_f^5]_{a'}—[OR_f^6]_{b'}—O—CF_2$—.

$R_f^4$ is a perfluorinated alkyl group having from 1 to 6 (in some embodiments, 1 to 4) carbon atoms. $R_f^5$ and $R_f^6$ are each independently perfluorinated alkylene having from 1 to 4 carbon atoms. a' and b' are each independently numbers having a value from 0 to 4. In some of these embodiments, t is 0, and r is 0.

In some embodiments of Rf, $Rf^d$, and $Rf^e$ are independently represented by formula $R_f^7—(OCF_2)_p$—, wherein p is an integer of 1 to 6 (in some embodiments, 1 to 4), and $R_f^7$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

In some embodiments of Rf, $Rf^d$, and $Rf^e$ are independently represented by formula $R^8—O—(CF_2)_p$—, wherein p is a number from 1 to 6 (in some embodiments, 1 to 4) and $R_f^8$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

In certain embodiments of Rf, L is selected from the group consisting of F and $CF_3$. In some embodiments, L is F. In other embodiments, L is $CF_3$.

In certain embodiments of Rf, W' is selected from the group consisting of alkylene and arylene. Alkylene includes linear, branched, and cyclic alkylene groups having from 1 to 10 (in some embodiments, 1 to 4) carbon atoms. In some embodiments, W' is methylene. In some embodiments, W' is ethylene. Arylene includes groups having 1 or 2 aromatic rings, optionally having at least one heteroatom (e.g., N, O, and S) in the ring, and optionally substituted with at least one alkyl group or halogen atom. In some embodiments, W' is phenylene.

In certain embodiments of Rf, t is 0 or 1. In some embodiments, t is 1. In some embodiments, t is 0. In embodiments wherein t is 0, $Rf^e$ is typically interrupted by at least one oxygen atom.

In certain embodiments of Rf, m is 1, 2, or 3. In some embodiments, m is 1.

In certain embodiments of Rf, n is 0 or 1. In some embodiments, n is 0. In some embodiments, n is 1.

In certain embodiments of Rf, p is a number from 1 to 6 (i.e., 1, 2, 3, 4, 5, or 6). In some embodiments, p is 1, 2, 5, or 6. In some embodiments, p is 3. In some embodiments, p is 1 or 2. In some embodiments, p is 5 or 6.

In certain embodiments of Rf, z is a number from 2 to 7 (i.e., 2, 3, 4, 5, 6, or 7). In some embodiments, z is an integer from 2 to 6, 2 to 5, 2 to 4, or 3 to 4.

In some embodiments, fluorinated polymers disclosed herein have an Rf group represented by $CF_3CFH—O—(CF_2)_p—$. In some of these embodiments Rf is selected from the group consisting of $CF_3CFH—O—(CF_2)_3—$ and $CF_3CFH—O—(CF_2)_5—$.

In some embodiments, fluorinated polymers disclosed herein have an Rf group represented by $CF_3—(O—CF_2)_z—$. In some of these embodiments, z is a number from 2 to 6, 2 to 5, 2 to 4, 3 to 5, or 3 to 4.

In some embodiments, fluorinated amphoteric compounds disclosed herein have an Rf represented by $CF_3—O—(CF_2)_3—O—CF_2—$.

Other useful Rf structures include partially fluorinated Rf groups disclosed, for example, in U.S. Pat. Appl. Pub. No. 2010/0179262 (Dams et al.), paragraphs [0075] to [0078], the disclosure of which is incorporated herein by reference.

In some embodiments of fluorinated polymers useful for practicing the present disclosure, the first divalent units have up to 6 fluorinated carbon atoms.

For any of the embodiments of the first divalent units, $R^1$ is hydrogen or methyl. In some embodiments, $R^1$ is hydrogen. In some embodiments, $R^1$ is methyl.

The fluorinated polymer in the composition according to and/or made according to the method of the present disclosure may have one or more second divalent units. In some embodiments, at least one of the second divalent units includes a pendent poly(alkyleneoxy) segment. The polyalkyleneoxy segment can comprise a plurality (i.e., multiple) of repeating alkyleneoxy groups having from 2 to 4 or 2 to 3 carbon atoms (e.g., $—CH_2CH_2O—$, $—CH(CH_3)CH_2O—$, $—CH_2CH(CH_3)O—$, $—CH_2CH_2CH_2O—$, $—CH(CH_2CH_3)CH_2O—$, $—CH_2CH(CH_2CH_3)O—$, or $—CH_2C(CH_3)_2O—$). In some embodiments, the segment comprises a plurality of ethoxy groups, propoxy groups, or combinations thereof. Two or more differing alkyleneoxy groups may be distributed randomly in the series or may be present in alternating blocks. In some embodiments, the pendent poly(alkyleneoxy) segment is a poly(ethyleneoxy) segment. In some embodiments, the poly(alkyleneoxy) segment has a number average molecular weight of up to 5000 grams per mole (in some embodiments, up to 3000, 2500, 1000, 750 or 500 grams per mole). In some embodiments, the number average molecular weight of the pendent poly(alkyleneoxy) segment is less than 500 grams per mole (in some embodiments, up to 450 grams per mole or 400 grams per mole).

In some embodiments, at least one of the second divalent units is represented by formula:

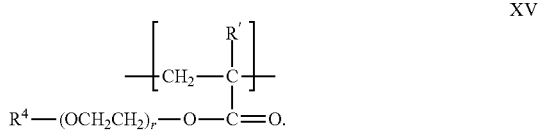

XV

In formula XV, each R' is independently hydrogen or methyl (in some embodiments, hydrogen, and in some embodiments, methyl). Each $R^4$ is independently alkyl having from 1 to 4 carbon atoms (e.g., methyl, ethyl, n-propyl, isopropyl, n-butyl, or isobutyl). In some embodiments, $R^4$ is methyl or ethyl. Also in formula XV, r is in a range from 1 to 50 (in some embodiments, 1 to 25, 5 to 25, or 5 to 20). The fluorinated polymer may include at least one (e.g., at least 1, 2, 5, 10, 15, 20, or at least 25) and up to 200, 100, or 50 second divalent units represented by formula XV.

In some embodiments, fluorinated polymers in the compositions according to and/or made according to the method of the present disclosure can be considered anionic polymers. In some of these embodiments, the fluorinated polymers comprise at least one (e.g., at least 1, 2, 5, 10, 15, 20, or at least 25) and up to 200, 100, or 50 second anionic divalent units represented by formula:

XVI

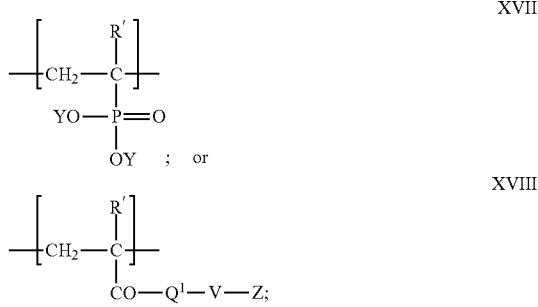

XVII

XVIII

In formula XVIII, $Q^1$ is $—O—$, $—S—$, or $—N(R^7)—$ (in some embodiments, $—O—$). In formulas XVI, XVII, and XVIII, each R' is independently hydrogen or methyl (in some embodiments, hydrogen, and in some embodiments, methyl). Each $R^7$ is independently hydrogen or alkyl having from 1 to 4 carbon atoms (e.g., methyl, ethyl, n-propyl, isopropyl, butyl, isobutyl, or t-butyl). V is alkylene that is optionally interrupted by at least one ether linkage (i.e., —O—) or amine linkage (i.e., —N($R^7$)—). In some embodiments, V is alkylene having from 2 to 4 (in some embodiments, 2) carbon atoms. Each Y is independently selected from the group consisting of hydrogen and a counter cation; and each Z is independently selected from the group consisting of —P(O)(OY)$_2$, —O—P(O)(OY)$_2$, —SO$_3$Y, and CO$_2$Y. In some embodiments, Y is hydrogen. In some embodiments, Y is a counter cation. Exemplary Y counter cations include alkali metal (e.g., sodium, potassium, and lithium), ammonium, alkyl ammonium (e.g., tetraalkylammonium), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, for example, of methods of treating hydrocarbon-bearing formations or hydrocarbon-bearing formations so-treated, Y is a bond to the hydrocarbon-bearing formation.

In some embodiments, including any of the aforementioned embodiments, fluorinated polymers in the compositions according to and/or made according to the method of the present disclosure can be considered cationic or amphoteric or can include an amine-oxide group. In some of these embodiments, the fluorinated polymers comprise at least one (e.g., at least 1, 2, 5, 10, 15, 20, or at least 25) and up to 200, 100, or 50 second divalent units represented by formula:

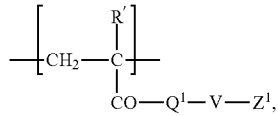

XIX

In formula XIX, R', $Q^1$, $R^7$, and V include any of the embodiments described above for formulas XVI, XVII, and XVIII. $Z^1$ is selected from the group consisting of —[N($R^8$)$_3$]M⁻, —N⁺(OY$^1$)($R^9$)$_3$, —N($R^8$)$_2$—(CH$_2$)$_g$—SO$_3$Y$^1$, and —N($R^8$)$_2$—(CH$_2$)$_g$—CO$_2$Y$^1$, wherein each $R^8$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl). Each $R^9$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl), wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms. Each g is independently an integer from 1 to 6 (i.e., 1, 2, 3, 4, 5, or 6). M– is a counter anion (e.g., acetate, chloride, iodide, ethyl sulfate and methyl sulfate); and Y$^1$ is selected from the group consisting of hydrogen and free anion. In some embodiments, R' and $R^7$ are each independently hydrogen or methyl. In some embodiments, for example, of methods of treating hydrocarbon-bearing formations or hydrocarbon-bearing formations so-treated, the counter anion M– is present in the hydrocarbon-bearing formation.

In some embodiments in which the fluorinated polymer includes a second divalent unit represented by formula XIX, $Z^1$ is —[N($R^8$)$_3$]M⁻, and the fluorinated polymer is a cationic polymer. In other embodiments where $Z^1$ is —[N($R^8$)$_3$]⁺M⁻, if the fluorinated polymer also includes an anionic divalent unit (e.g., represented by formula XVI, XVII, or XVIII) the fluorinated polymer is an amphoteric polymer.

In some embodiments in which the fluorinated polymer includes a second divalent unit represented by formula XIX, $Z^1$ is selected from the group consisting of —N⁺($R^8$)$_2$—(CH$_2$)$_g$—SO$_3$Y$^1$ and —N⁺($R^8$)$_2$—(CH$_2$)$_g$—CO$_2$Y$^1$, and the polymer can be considered an amphoteric polymer. In some embodiments, $Z^1$ is —N($R^8$)$_2$—(CH$_2$)$_g$—SO$_3$Y$^1$ or —N($R^8$)$_2$—(CH$_2$)$_g$—CO$_2$Y$^1$. In these embodiments, it is generally understood that under neutral pH conditions (e.g., pH 6 to 8), Y$^1$ in $Z^1$ is typically a free anion (i.e., $Z^1$ is —N⁺($R^8$)$_2$—(CH$_2$)$_g$—SO$_3$— or —N⁺($R^8$)$_2$—(CH$_2$)$_g$—CO$_2$—). Under strongly acidic conditions (e.g, pH of up to 4), Y$^1$ in $Z^1$ is hydrogen. In some embodiments in which the fluorinated polymer includes a second divalent unit represented by formula XIX, $Z^1$ is —N⁺(OY$^1$)($R^9$)$_3$, which is an amine-oxide group.

Fluorinated polymers in the compositions according to the present disclosure can be prepared, for example, by polymerizing a mixture of components typically in the presence of an initiator. By the term "polymerizing" it is meant forming a polymer or oligomer that includes at least one identifiable structural element due to each of the components. Typically the polymer that is formed has a distribution of molecular weights and compositions. The polymer may have one of many structures (e.g., a random graft copolymer or a block copolymer). The method of making a composition according to the present disclosure includes combining components comprising a fluorinated monomer and at least a second monomer. The components that are useful for preparing the fluorinated polymers disclosed herein include a fluorinated free-radically polymerizable monomer independently represented by formula Rf-Q-(C$_m$H$_{2m}$)—O—C(O)—C($R^1$)=CH$_2$, Rf—SO$_2$—N(R)—(CH$_{2n}$)—O—C(O)—C($R^1$)=CH$_2$, or Rf—CO—N(R)—(C$_n$H$_{2n}$)—O—C(O)—C($R^1$)=CH$_2$, wherein Rf, R, $R^1$, m, and n are as defined above.

Some compounds of Formula Rf-Q-(C$_m$H$_{2m}$)—O—C(O)—C($R^1$)=CH$_2$, are available, for example, from commercial sources (e.g., 3,3,4,4,5,5,6,6,6-nonafluorohexyl acrylate from Daikin Chemical Sales, Osaka, Japan; 3,3,4,4,5,5,6,6,6-nonafluorohexyl 2-methylacrylate from Indofine Chemical Co., Hillsborough, N.J.; 1H,1H,2H,2H-perfluorooctylacrylate from ABCR, Karlsruhe, Germany; and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP 1311637 B1, published Apr. 5, 2006, for the preparation of 2,2,3,3,4,4,4-heptafluorobutyl 2-methylacrylate). Compounds wherein Q is —SO$_2$N(R)— can be made according to methods described in, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference. A perfluoropolyether monomer of formula Rf—(CO)NHCH$_2$CH$_2$O(CO)C(R)=CH$_2$ can be prepared by first reacting Rf—C(O)—OCH$_3$, for example, with ethanolamine to prepare alcohol-terminated Rf—(CO)NHCH$_2$CH$_2$OH, which can then be reacted with methacrylic acid, methacrylic anhydride, acrylic acid or acryloyl chloride to prepare the compound of Formula Rf—(CO)NHCH$_2$CH$_2$O(CO)C(R)=CH$_2$, wherein R is methyl or hydrogen, respectively. Other amino alcohols (e.g., amino alcohols of formula NRHXOH) can be used in this reaction sequence. In further examples, an ester of formula Rf—C(O)—OCH$_3$ or a carboxylic acid of formula Rf—C(O)—OH can be reduced using conventional methods (e.g., hydride, for example sodium borohydride, reduction) to an alcohol of formula Rf—CH$_2$OH. The alcohol of formula Rf—CH$_2$OH can then be reacted with methacryloyl chloride, for example, to provide a perfluoropolyether monomer of formula Rf—CH$_2$O(CO)C(R)=CH$_2$. Examples of suitable reactions and reagents are further disclosed, for example, in the European patent EP 870 778 A1, published Oct. 14, 1998, and U.S. Pat. No. 3,553,179 (Bartlett et al.). Other fluorinated acrylates and methacrylates having polyfluoropolyether groups can be prepared as described in U.S. Pat. Appl. Pub. No. 2010/0179262 (Dams et al.).

In some embodiments, the components that are useful for preparing the polymers disclosed herein include a poly(alkyleneoxy) acrylate including a poly(alkyleneoxy) segment. Some alkyleneoxy-containing polymerizable compounds are commercially available (e.g., polyoxyalkylene glycol acrylates and diacrylates (e.g., diethylene glycol diacrylate, tri(ethylene glycol)dimethacrylate, tri(ethylene glycol)divinyl ether, ethoxyethoxyethyl acrylate, methoxy polyethylene glycol acrylates of various molecular weights, and CH$_2$=CHC(O)O(CH$_2$CH$_2$O)$_{7-9}$H available, for example, from Nippon Oil & Fats Company, Tokyo, Japan under the trade designation "BLEMMER"). Other useful alkyleneoxy-containing polymerizable compounds can be prepared by known methods, for example, combining one or two equivalents of acryloyl chloride or acrylic acid with a polyethylene glycol or a monoalkyl ether thereof having a molecular weight of about 200 to 5000 grams per mole.

Divalent units of Formulas XVI, XVII, and XVIII can be incorporated into the fluorinated polymers disclosed herein by copolymerization of a compound of formula Rf-Q-(C$_m$H$_{2m}$)—O—C(O)—C(R$^1$)=CH$_2$ or Rf—SO$_2$—(C$_n$H$_{2n}$)—O—C(O)—C(R$^1$)=CH$_2$ with a compound of formula YOOC—C(R')=CH$_2$, (YO)$_2$(O)P—C(R')=CH$_2$, and Z—V-Q$^1$C(O)—C(R')=CH$_2$, respectively. Useful compounds of these formulas include acrylic acid, methacrylic acid, β-carboxyethyl acrylate, β-carboxyethyl methacrylate, vinyl phosphonic acid, ethylene glycol methacrylate phosphate, and 2-acrylamido-2-methyl-1-propane sulfonic acid (AMPS).

Divalent units of Formula XIX can be incorporated into the fluorinated polymers disclosed herein by copolymerization of a compound of formula Rf-Q-(C$_m$H$_{2m}$)—O—C(O)—C(R$^1$)=CH$_2$ or Rf—SO$_2$—(C$_n$H$_{2n}$)—O—C(O)—C(R$^1$)=CH$_2$ with a compound of formula Z$^1$—V-Q$^1$C(O)—C(R')=CH$_2$. Useful compounds for preparing compound of formula Z$^1$—V-Q$^1$C(O)—C(R')=CH$_2$ include aminoalkyl (meth)acrylates such as N,N-diethylaminoethylmethacrylate, N,N'-dimethylaminoethylmethacrylate and N-t-butylaminoethylmethacrylate, which are commercially available, for example, from Sigma-Aldrich and can be quaternized using conventional techniques, for example, by reaction with an alkyl halide (e.g., bromobutane, bromoheptane, bromodecane, bromododecane, or bromohexadecane) or an alkyl sulfate (e.g., dimethyl sulfate or diethyl sulfate) in a suitable solvent and optionally in the presence of a free-radical inhibitor to provide a compound wherein Z$^1$ is —[N(R$^8$)$_3$]+M. Useful compounds having formula Z$^1$—V-Q$^1$C(O)—C(R')=CH$_2$ include N,N-dimethylaminoethyl acrylate methyl chloride quaternary and N,N-dimethylaminoethyl methacrylate methyl chloride quaternary available from Ciba Specialty Chemicals, Basel, Switzerland, under the trade designations "CIBA AGEFLEX FA1Q80MC" and "CIBA AGEFLEX FM1Q75MC", respectively.

Divalent units of Formula XIX can be incorporated into the fluorinated polymers disclosed herein by copolymerization of a compound of formula Rf-Q-(C$_m$H$_{2m}$)—O—C(O)—C(R$^1$)=CH$_2$ or Rf—SO$_2$—(C$_n$H$_{2n}$)—O—C(O)—C(R$^1$)=CH$_2$ with a compound of formula N(R$^8$)$_2$—V-Q$^1$C(O)—C(R')=CH$_2$ followed by 1,3-propanesultone, acrylic acid, chloroacetic acid, or 2-bromoethanesulfonic acid using the methods described in U.S. Pat. No. 5,144,069 (Stern et al.) and U.S. Pat. No. 5,468,353 (Anich et al.), the disclosure of which methods are incorporated herein by reference. Useful compounds of formula N(R$^8$)$_2$—V-Q$^1$C(O)—C(R')=CH$_2$ include aminoalkyl(meth)acrylates such as those described above.

Fluorinated polymers useful in the compositions according to the present disclosure have a sufficient amount of second divalent units such that the fluorinated polymer and the non-fluorinated polymer together form a solution or a dispersion. In some embodiments, the fluorinated polymer and the non-fluorinated polymer form a solution. In some embodiments, the fluorinated polymer and the non-fluorinated polymer form a dispersion. When both the fluorinated polymer and the non-fluorinated polymer are liquids, the dispersion may also be called an emulsion. The compositions can be clear, which is typically a characteristic of a solution, or they may be hazy, which may be a characteristic of an emulsion or a dispersion (e.g., a colloidal dispersion). In general, the presence of a sufficient amount of the second divalent units prevents the phase separation of the fluorinated polymer and the non-fluorinated polymer into two distinct liquid layers or a solid precipitate in a liquid. The amount of the second divalent units sufficient to provide a solution, emulsion, or dispersion may vary depending on the pendent group of the second divalent unit, but generally when the second divalent unit is present in an amount of at least 10 percent by weight based on the total weight of the fluorinated polymer, the fluorinated polymer and the non-fluorinated polymer can form a solution, emulsion, or a dispersion. Advantageously, the second divalent units can be present in an amount by weight greater than the first divalent units. For example, the second divalent units may be present in an amount of at least 50 (in some embodiments, at least 60 or 70) percent by weight, based on the total weight of the fluorinated polymer. This is advantageous because lower amounts of fluorinated monomers may be used; therefore, the fluorinated polymer may be lower in cost. Even with a relatively low amount of fluorinated carbons in the composition, useful surface tension reductions and wettability modifications can be achieved, as shown in the Examples, below. In some of these embodiments, at least one of the second divalent units includes a pendent poly(alkyleneoxy) segment.

In some embodiments, fluorinated polymers in compositions according to and/or made according to the present disclosure further comprise at least one (e.g., at least 1, 2, 5, 10, 15, 20, 25, or at least 50) divalent unit represented by Formula XX:

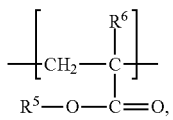

wherein each $R^6$ is independently hydrogen or methyl (in some embodiments, hydrogen, in some embodiments, methyl), and wherein each $R^5$ is independently alkyl having from 1 to 30 (in some embodiments, 1 to 25, 1 to 20, 1 to 10, 4 to 25, 8 to 25, or 12 to 25) carbon atoms. In some embodiments, each $R^5$ is independently alkyl having up to 8 carbon atoms (e.g., methyl, ethyl, n-propyl, isopropyl, n-butyl, iso-butyl, n-pentyl, neopentyl, hexyl, heptyl, or octyl). In some embodiments, $R^5$ is hexadecyl or octadecyl. In some of these embodiments, the fluorinated polymer is prepared by including at least one compound represented by formula $R^5$—O—C(O)—C($R^6$)=CH$_2$ in the components to be polymerized. Compounds of formula $R^5$—O—C(O)—C($R^6$)=CH$_2$, (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula $R^5$—O—C(O)—C($R^6$)=CH$_2$ are available as single isomers (e.g., straight-chain isomer) of single compounds. Other compounds of formula $R^5$—O—C(O)—C($R^6$)=CH$_2$ are available, for example, as mixtures of isomers (e.g., straight-chain and branched isomers), mixtures of compounds (e.g., hexadecyl acrylate and octadecylacrylate), and combinations thereof.

Fluorinated polymers in compositions of the present disclosure may also be preparable by adding additional monomers to the polymerization reaction. For example, a compound formula HO—V—O—C(O)—C(R')=CH$_2$, wherein R' and V are as defined above may be used. Examples of these monomers include 2-hydroxyethyl methacrylate. Other examples include vinylidene chloride; vinyl chloride; silicone acrylates available, for example, from Shin-Etsu Silicones of America, Inc., Akron, Ohio, under the trade designation "X22-2426"; urethane acrylates available, for example, from Sartomer Company, Exton, Pa. under the trade designation "CN966J75", allyl esters (e.g., allyl acetate and allyl heptanoate); vinyl ethers or allyl ethers (e.g., cetyl vinyl ether, dodecylvinyl ether, 2-chloroethylvinyl ether, or ethylvinyl ether); alpha-beta unsaturated nitriles (e.g., acrylonitrile, methacrylonitrile, 2-chloroacrylonitrile, 2-cyanoethyl acrylate, or alkyl cyanoacrylates); alpha-beta-unsaturated carboxylic acid derivatives (e.g., allyl alcohol, allyl glycolate, acrylamide, methacrylamide, n-diisopropyl acrylamide, or diacetoneacrylamide), styrene and its derivatives (e.g., vinyltoluene, alpha-methylstyrene, or alpha-cyanomethyl styrene); and olefinic hydrocarbons which may contain at least one halogen (e.g., ethylene, propylene, isobutene, 3-chloro-1-isobutene, butadiene, isoprene, chloro and dichlorobutadiene, 2,5-dimethyl-1,5-hexadiene, and vinyl and vinylidene chloride).

In the compositions according to and/or made according to the present disclosure, the non-fluorinated polymer is $R^2O$-$(EO)_p$—$(R^3O)_q$-$(EO)_p$—$R^2$ or $R^2O$—$(R^3O)_q$-$(EO)_p$—$(R^3O)_q$—$R^2$. In some embodiments, the non-fluorinated polymer is $R^2O$-$(EO)_p$—$(R^3O)_q$-$(EO)_p$—$R^2$. $R^2$ is alkyl having up to 4 carbon atoms (e.g., methyl, ethyl, n-propyl, isopropyl, butyl, isobutyl, or t-butyl) or hydrogen. In some embodiments, each $R^2$ is hydrogen. EO represents —CH$_2$CH$_2$O—. Each $R^3O$ is independently selected from the group consisting of —CH(CH$_3$)CH$_2$O—, —CH$_2$CH$_2$CH$_2$O—, —CH$_2$CH(CH$_3$)O—, —CH$_2$CH$_2$CH$_2$CH$_2$O—, —CH(CH$_2$CH$_3$)CH$_2$O—, —CH$_2$CH(CH$_2$CH$_3$)O—, and —CH$_2$C(CH$_3$)$_2$O—. In some embodiments, each $R^3O$ independently represents —CH(CH$_3$)CH$_2$O— or —CH$_2$CH(CH$_3$)O—. Each p is independently a value from 0 to 150 (in some embodiments, from 7 to about 130, or from 14 to about 130); and each q is independently a value from 0 to 150 (in some embodiments, from about 20 to about 100, 1 to 55, or from about 9 to about 25). The sum p+q is at least 5 (in some embodiments, at least 10, 15, 20, or at least 25.) In some embodiments, the ratio p/q has a value from at least 0.5, 0.75, 1 or 1.5 to 2.5, 2.7, 3, 4, 5, or more. For example, the percentage of the repeating EO groups in the non-fluorinated polymer can be in a range from 10 to 90, 10 to 75, or 20 to 50, based on the total number of EO and $R^3O$ groups in the non-fluorinated polymer. Useful non-fluorinated polymers include those available from Dow Chemical Company, Midland, Mich., under the trade designation "CARBOWAX" and block copolymers of ethylene oxide and propylene oxide having a molecular weight of about 500 to 15000 grams per mole (e.g., those available from BASF Corporation, Ludwigshafen, Germany, under the trade designation "PLURONIC"). In some embodiments, the non-fluorinated polymer has a number average molecular weight in a range from 200 to 15,000, 1000 to 15,000, 1000 to 10,000, or 1000 to 5000 grams per mole.

The fluorinated polymer in the composition according to and/or made according to the present disclosure has not more than 2.5 percent (in some embodiments, not more than 2, 1.5, or 1 percent) by weight units represented by formula:

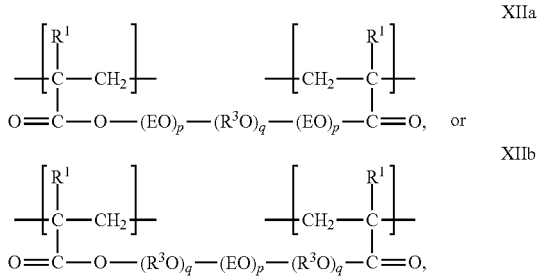

wherein $R^1$, $R^3O$, EO, p, and q are as defined above. In some embodiments, the fluorinated polymer is free of units represented by formula XIIa and XIIb. In some embodiments, the fluorinated polymer has not more than 2.5 percent (in some embodiments, not more than 2, 1.5, or 1 percent) by weight units represented by formula XIIa and XIIb in which p is in a range from 10 to 12 and q is in a range from 20 to 23. In some embodiments, the fluorinated polymer is free of units represented by formula XIIa and XIIb in which p is in a range from 10 to 12 and q is in a range from 20 to 23.

It is known to copolymerize fluorinated acrylates and methacrylates with a mixture of mono- and difunctional acrylates and methacrylates made from poly(alkyleneoxy) diols. See, for example, U.S. Pat. No. 3,787,351 (Olson), U.S. Pat. No. 3,944,527 (McCown), and U.S. Pat. No. 5,370,919 (Fieuws). Since the diols are typically reacted with a sub-stoichiometric amount of acrylic acid or methacrylic acid or their equivalents, a mixture of diol, monofunctional acrylate or methacrylates, and difunctional acrylates and methacrylates are reacted with the fluorinated acrylates and methacrylates. The resulting copolymers have significant amounts of units derived from the difunctional monomers. The presence of such difunctional units in a monomer mixture or copolymer is readily ascertained by a person skilled in the art, for example, using nuclear magnetic resonance spectroscopy. The presence of difunctional acrylates or methacrylates in fluorinated copolymers leads to crosslinking, which may limit the solubility of the copolymer in a desired solvent or formulation, increase viscosity, or cause gellation. Sometimes high amounts of chain transfer agents are necessary to counteract these affects in such copolymers. The fluorinated polymers in the composition according to and/or made according to the present disclosure are generally not made by copolymerization of fluorinated monomers with high amounts of difunctional, non-fluorinated acrylates or methacrylate monomers. For example, the fluorinated polymers disclosed herein typically are not made by copolymerization of fluorinated monomers with high amounts of difunctional acrylates methacrylate monomers prepared from the non-fluorinated polymers disclosed herein in which $R^2$ is hydrogen. Thus, the fluorinated polymer disclosed herein has not more than 2.5 percent by weight of units represented by XIIa and XIIb, based on the weight of the fluorinated polymer.

The polymerization reaction for making the compositions disclosed herein can be carried out in the presence of an added free-radical initiator. Free radical initiators such as those widely known and used in the art may be used to initiate polymerization of the components. Exemplary free-radical initiators are described in U.S. Pat. No. 6,664,354 (Savu et al.), the disclosure of which, relating to free-radical initiators, is incorporated herein by reference. In some embodiments, the polymer or oligomer that is formed is a random graft copolymer. In some embodiments, the polymer or oligomer that is formed is a block copolymer.

The polymerization reaction advantageously can be carried out in the absence of volatile organic solvent. The fluorinated polymer including the first and at least one second divalent unit is unexpectedly compatible with the non-fluorinated polymer, so no volatile organic solvent is required. Accordingly, in some embodiments, the composition according to the present disclosure is essentially free of volatile organic solvent. Also, in some embodiments of the method of making a composition according to the present disclosure, the combination of the components is essentially free of volatile organic solvent. Volatile organic solvents are typically those have a boiling point of up to 150° C. at atmospheric pressure. Examples of these include esters, ketones, and toluene. "Essentially free of volatile organic solvent" can mean that volatile organic solvent may be present (e.g., from a previous synthetic step or in a commercially available monomer) in an amount of up to 2.5 (in some embodiments, up to 2, 1, 0.5, 0.1, 0.05, or 0.01) percent by weight, based on the total weight of the composition. Advantageously, compositions disclosed herein can be made without the expensive manufacturing step of removing organic solvent. The neat compositions (that is, without organic solvent) are typically homogeneous, and both the fluorinated polymer and the non-fluorinated polymer can serve to reduce the surface tension of a liquid.

Polymerization can be carried out at any temperature suitable for conducting an organic free-radical reaction. Temperature for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly (ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate polymer or copolymer.

In some embodiments, fluorinated polymers disclosed herein have weight average molecular weights in a range from 1000 grams per mole to 100,000 grams per mole. In some embodiments, the weight average molecular weight is at least 2000, 3000, 4000, 5000, 6000, 7000, 8000, 9000, or 10000 grams per mole up to 30,000, 40,000, 50,000, 60,000, 70,000, 80,000, or up to 90,000 grams per mole. Fluorinated polymers disclosed herein typically have a distribution of molecular weights and compositions. Weight average molecular weights can be measured, for example, by gel permeation chromatography (i.e., size exclusion chromatography) using techniques known to one of skill in the art.

The weight ratio of the fluorinated polymer to the non-fluorinated polymer in the compositions according to and/or made according to the present disclosure may be in a range from 90:10 to 10:90, 70:30 to 30:70, or 80:20 to 50:50 although other ratios may be useful.

The compositions disclosed herein include a non-fluorinated polymer, in some embodiments, at least at 10, 20, 30, 40, or 50 percent by weight, based on the total weight of the composition. Nevertheless, surprisingly they provide surface tension reduction that may be expected from compositions including a larger amount of fluoro-groups. Thus the compositions disclosed herein have a high fluorine efficiency, which may provide advantages, for example, in manufacturing cost. For example, Examples 27 to 29 and Tables 7 and 8 in the Examples, below, demonstrate that the surface tension reduction provided by the compositions according to the present disclosure is unexpectedly high given the amount of fluoro-groups in the composition. Examples 27 to 29 provide surface tension reduction that is comparable to that provided by a fluorinated polymer having a pendent poly(alkyleneoxy) group but containing no non-fluorinated polymer as in the presently disclosed compositions and made from a much higher weight percentage of the same fluorinated monomer. For example, in Examples 27 to 29, about five or ten percent by weight of the composition is derived from a fluorinated monomer whereas in U.S. Pat. No. 6,664,354 (Savu et al.) many of the fluorinated surfactants are derived from monomer mixtures containing at least 20 or 30 percent by weight fluorinated monomer, based on the weight of the non-volatile components.

The present disclosure provides a method of treating a hydrocarbon-bearing formation comprising contacting the hydrocarbon-bearing formation with a treatment composition including solvent and composition including a fluorinated polymer and a non-fluorinated polymer described in any of the above embodiments. Typically, in treatment compositions useful for practicing the method of treating a hydrocarbon-bearing formation, the composition including the fluorinated polymer and the non-fluorinated polymer is present in the treatment composition at at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the treatment composition. For example, the amount of the composition including the fluorinated polymer and the non-fluorinated polymer in the treatment compositions may be in a range of from 0.01 to 10, 0.1 to 10, 0.1 to 5, 1 to 10, 0.5 to 2, or in a range from 1 to 5 percent by weight, based on the total weight of the treatment composition. Lower and higher amounts may also be used, and may be desirable for some applications.

Treatment compositions useful for practicing the method of treating a hydrocarbon-bearing formation disclosed herein comprise at least one solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly(propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers such as ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.); ketones (e.g., acetone or 2-butanone); and combinations thereof.

In some embodiments of the method of treating a hydrocarbon-bearing formation disclosed herein, the solvent comprises at least one of a polyol or polyol ether independently having from 2 to 25 (in some embodiments, 2 to 15, 2 to 10, 2 to 9, or 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment. In some embodiments, the solvent comprises at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments of the method of treating a hydrocarbon-bearing formation disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the method of treating a hydrocarbon-bearing formation disclosed herein, the treatment compositions comprise at least two organic solvents. In some embodiments, the treatment compositions comprise at least one of a polyol or polyol ether independently having from 2 to 25 (in some embodiments, 2 to 15, 2 to 10, 2 to 9, or even 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol methyl ether may be a polyol ether or a monohydroxy alcohol, but not both simultaneously. In these embodiments, each solvent component may be present as a single component or a mixture of components. In some embodiments, compositions useful for practicing the methods disclosed herein comprise at least one of a polyol or polyol ether independently having from 2 to 25 (in some embodiments, 2 to 15, 2 to 10, 2 to 9, or even 2 to 8) carbon atoms and at least one monohydroxy alcohol having up to 4 carbon atoms. In some embodiments, the solvent consists essentially of (i.e., does not contain any components that materially affect water solubilizing or displacement properties of the composition under downhole conditions) at least one of a polyol having from 2 to 25 (in some embodiments, 2 to 20, 2 to 15, 2 to 10, 2 to 9, 2 to 8, or even 2 to 6) carbon atoms or polyol ether having from 3 to 25 (in some embodiments, 3 to 20, 3 to 15, 3 to 10, 3 to 9, 3 to 8, or even from 5 to 8) carbon atoms, and at least one monohydroxy alcohol having from 1 to 4 carbon atoms, ether having from 2 to 4 carbon atoms, or ketone having from 3 to 4 carbon atoms. Typically, the solvents described herein are capable of solubilizing more brine in the presence of fluorinated polymer than methanol alone.

In some embodiments of method of treating a hydrocarbon-bearing formation according to the present disclosure, useful solvents at least one of at least partially solubilize or at least partially displace brine in the hydrocarbon-bearing formation. By the term "solubilizes", it is meant that the solvent dissolves the water and the salts in the brine. "At least partially solubilize" includes dissolving all or nearly all (e.g., at least 95% including up to 100%) of the water and the salts in the brine. In some embodiments, useful solvents at least partially solubilize or at least partially displace liquid hydrocarbons in the hydrocarbon-bearing formation.

For any of the embodiments of the method of treating a hydrocarbon-bearing formation disclosed herein, wherein the treatment compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at at least 50, 55, 60, or 65 percent by weight and up to 75, 80, 85, or 90 percent by weight, based on the total weight of the composition. Exemplary solvent combinations that contain at least one of a polyol or polyol ether include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. In some embodiments of the methods disclosed herein, the solvent comprises up to 95, 90, 80, 70, 60, 50, 40, 30, 20, or 10 percent by weight of a monohydroxy alcohol having up to 4 carbon atoms, based on the total weight of the composition.

In some embodiments of treatment compositions disclosed herein, the solvent comprises a ketone, ether, or ester having from 4 to 10 (e.g., 5 to 10, 6 to 10, 6 to 8, or 6) carbon atoms or a hydrofluoroether or hydrofluorocarbon. In some of these embodiments, the solvent comprises two different ketones, each having 4 to 10 carbon atoms (e.g., any combination of 2-butanone, 4-methyl-2-pentanone, 3-methyl-2-pentanone, 2-methyl-3-pentanone, and 3,3-dimethyl-2-butanone). In some embodiments, the solvent further comprises at least one of water or a monohydroxy alcohol having up to 4 carbon atoms (e.g., methanol, ethanol, n-propanol, isopropanol, 1-butanol, 2-butanol, isobutanol, and t-butanol). Useful ethers having 4 to 10 carbon atoms include diethyl ether, diisopropyl ether, tetrahydrofuran, p-dioxane, and tert-butyl methyl ether. Useful esters having 4 to 10 carbon atoms include ethyl acetate, propyl acetate, and butyl acetate. Useful hydrofluoroethers may be represented by the general formula $Rf^3$—$[O—R_h]_a$, wherein a is an integer from 1 to 3; $Rf^3$ is a perfluoroalkyl or di- or trivalent perfluoroalkylene, each of which may be interrupted with at least one —O—; and $R_h$ is an alkyl group optionally interrupted with at least one —O—. Numerous hydrofluoroethers of this type are disclosed in U.S. Pat. No. 6,380,149 (Flynn et al.), the disclosure of which is incorporated herein by reference. In some embodiments, the hydrofluoroether is methyl perfluorobutyl ether or ethyl perfluorobutyl ether. Useful hydrofluoroethers also include hydrofluoroethers available, for example, from 3M Company, St. Paul, Minn., under the trade designations "HFE-7100" and "HFE-7200".

The amount of solvent typically varies inversely with the amount of other components in treatment compositions useful for practicing the method of treating a hydrocarbon-bearing formation. For example, based on the total weight of the treatment composition the solvent may be present in the treatment composition in an amount of from at least 10, 20, 30, 40, or 50 percent by weight or more up to 60, 70, 80, 90, 95, 98, or 99 percent by weight, or more.

The ingredients for treatment compositions described herein for treating hydrocarbon-bearing formations can be combined using techniques known in the art for combining these types of materials, including using conventional magnetic stir bars or mechanical mixer (e.g., in-line static mixer and recirculating pump).

Although not wishing to be bound by theory, it is believed that a method of treating a hydrocarbon-bearing according to the present disclosure will provide more desirable results when the treatment composition is homogenous at the temperature(s) encountered in the hydrocarbon-bearing formation. Whether the treatment composition is homogeneous at the temperature can depend on many variables (e.g., concentration of the fluorinated polymer and non-fluorinated polymer, solvent composition, brine concentration and composition, hydrocarbon concentration and composition, and the presence of other components (e.g., surfactants)). Again, not wishing to be bound by theory, it is believed that once the treatment composition contacts a hydrocarbon-bearing formation (e.g., downhole), the environment will cause the fluorinated polymer and/or non-fluorinated polymer to become less soluble in the composition and adsorb onto at least one of the formation or at least a portion of a plurality of proppants located in a fracture in the formation. Once adsorbed onto the formation or at least a portion of a plurality of proppants, the fluorinated polymer and/or non-fluorinated polymer can modify the wetting properties of the formation and cause an increase in at least one of the gas or oil permeabilities in the formation. The fluorinated polymer and/or non-fluorinated polymer may remain on the rock for the duration of an extraction of hydrocarbons from the formation (e.g., 1 week, 2 weeks, 1 month, or longer).

In some embodiments of method of treating a hydrocarbon bearing formation and treated hydrocarbon-bearing formations disclosed herein, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formations). The brine may cause water blocking in the hydrocarbon-bearing formation before treatment. In some embodiments of the treatment compositions, the solvent at least partially solubilizes or at least partially displaces brine in the hydrocarbon-bearing formation. In some embodiments, the brine has at least 2, 3, 4, 5, 6, 7, 8, 9, or at least 10 weight percent dissolved salts (e.g., sodium chloride, calcium chloride, strontium chloride, magnesium chloride, potassium chloride, ferric chloride, ferrous chloride, and hydrates thereof), based on the total weight of the brine. Although not wanting to be bound by theory, it is believed that the effectiveness of the methods disclosed herein for improving hydrocarbon productivity of a particular oil and/or gas well having brine accumulated in the near wellbore region will typically be determined by the ability of the treatment composition to dissolve or displace the quantity of brine present in the near wellbore region of the well without causing precipitation of the fluorinated polymer, the non-fluorinated polymer, or salts. Hence, at a given temperature greater amounts of treatment compositions having lower brine solubility (i.e., treatment compositions that can dissolve a relatively lower amount of brine) will typically be needed than in the case of treatment compositions having higher brine solubility and containing the same composition of fluorinated polymer and non-fluorinated polymer at the same concentration.

In some embodiments, a mixture of an amount of the brine composition and the treatment composition, at the temperature of the hydrocarbon-bearing formation, is transparent and free of precipitated solids. As used herein, the term transparent refers to allowing clear view of objects beyond. In some embodiments, transparent refers to liquids that are not hazy or cloudy. The term "substantially free of precipitated solid" refers to an amount of precipitated solid that does not interfere with the ability of the fluorinated polymer to increase the gas or liquid permeability of the hydrocarbon-bearing formation. In some embodiments, "substantially free of precipitated solid" means that no precipitated solid is visually observed. In some embodiments, "substantially free of precipitated solid" is an amount of solid that is less than 5% by weight higher than the solubility product at a given temperature and pressure.

In some embodiments, the transparent mixture of the brine composition and the treatment composition does not separate into layers, and in other embodiments, the transparent mixture of the brine composition and the treatment composition separates into at least two separate transparent liquid layers. Phase behavior of a mixture of the brine composition and the treatment composition can be evaluated before treating the hydrocarbon-bearing formation by obtaining a sample of the brine from the hydrocarbon-bearing formation and/or analyzing the composition of the brine from the hydrocarbon-bearing formation and preparing an equivalent brine having the same or similar composition to the composition of the brine in the formation. The brine composition and the treatment composition can be combined (e.g., in a container) at the temperature and then mixed together (e.g., by shaking or stirring). The mixture is then maintained at the temperature for a certain time period (e.g., 15 minutes), removed from the heat, and immediately visually evaluated to see if phase separation, cloudiness, or precipitation occurs. The amount of the brine composition in the mixture may be in a range from 5 to 95 percent by weight (e.g., at least 10, 20, 30, percent by weight and up to 35, 40, 45, 50, 55, 60, or 70 percent by weight) based on the total weight of the mixture.

Whether the mixture of the brine composition and the treatment composition is transparent, substantially free of precipitated solid, and separates into layers at the temperature of the hydrocarbon-bearing formation can depend on many variables (e.g., concentration of the fluorinated polymer and/or non-fluorinated polymer, solvent composition, brine concentration and composition, hydrocarbon concentration and composition, and the presence of other components (e.g., surfactants or scale inhibitors)). Typically, for treatment compositions comprising at least one of a polyol or polyol ether described above and a monohydroxy alcohol having up to 4 carbon atoms, mixtures of the brine composition and the treatment composition do not separate into two or more layers. In some of these embodiments, the salinity of the brine is less than 150,000 ppm (e.g., less than 140,000, 130,000, 120,000, or 110,000 ppm) total dissolved salts. Typically, for treatment compositions described above comprising at least one (e.g., one or two) ketone having from 4 to 10 carbon atoms or a hydrofluoroether, mixtures of the brine composition and the treatment composition separate into two or more layers. In some of these embodiments, the salinity of the brine is greater than 100,000 ppm (e.g., greater than 110,000, 125,000, 130,000, or 150,000 ppm) total dissolved salt. Although not wishing to be bound by theory, it is believed that when two or more layers form in such mixtures, the fluorinated polymer preferentially partitions into a layer rich in organic solvent that has a lower concentration of dissolved salts. Typically, treatment compositions comprising at least one of a polyol or polyol ether described above and treatment compositions comprising at least one ketone having from 4 to 10 carbon atoms or a hydrofluoroether are capable of solubilizing more brine (i.e., no salt precipitation occurs) in the presence of a fluorinated polymer than methanol, ethanol, propanol, butanol, or acetone alone.

The phase behavior of the treatment composition and the brine can be evaluated over an extended period of time (e.g., 1 hour, 12 hours, 24 hours, or longer) to determine if any phase separation, precipitation, or cloudiness is observed. By adjusting the relative amounts of brine (e.g., equivalent brine) and the treatment composition, it is possible to determine the maximum brine uptake capacity (above which precipitation occurs) of the treatment composition at a given temperature. Varying the temperature at which the above procedure is carried out typically results in a more complete understanding of the suitability of treatment compositions for a given well.

In some embodiments of the method of treating a hydrocarbon-bearing formation disclosed herein, the hydrocarbon-bearing formation has both liquid hydrocarbons and gas, and the hydrocarbon-bearing formation has at least a gas permeability that is increased after the hydrocarbon-bearing formation is treated with the treatment composition. In some embodiments, the gas permeability after treating the hydrocarbon-bearing formation with the treatment composition is increased by at least 5 percent (in some embodiments, by at least 10, 15, 20, 30, 40, 50, 60, 70, 80, 90, or 100 percent or more) relative to the gas permeability of the formation before treating the formation. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or 100 percent or more) after treating the formation. The method of treating a hydrocarbon-bearing formation disclosed herein are typically useful for treating formations having two phases of hydrocarbons (e.g., in gas wells having retrograde condensate and oil wells having black oil or volatile oil).

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 m$^3$/m$^3$). For example, a black oil may have a GOR in a range from about 100 (18), 200 (36), 300 (53), 400 (71), or 500 scf/stb (89 m$^3$/m$^3$) up to about 1800 (320), 1900 (338), or 2000 scf/stb (356 m$^3$/m$^3$). The term "volatile oil" refers to the class of crude oil typically having a GOR in a range between about 2000 and 3300 scf/stb (356 and 588 m$^3$/m$^3$). For example, a volatile oil may have a GOR in a range from about 2000 (356), 2100 (374), or 2200 scf/stb (392 m$^3$/m$^3$) up to about 3100 (552), 3200 (570), or 3300 scf/stb (588 m$^3$/m$^3$). In some embodiments, the treatment composition at least partially solubilizes or at least partially displaces the liquid hydrocarbons in the hydrocarbon-bearing formation.

Generally, for the method of treating a hydrocarbon-bearing formation disclosed herein, the amounts of the composition including the fluorinated polymer and non-fluorinated polymer and solvent (and type of solvent) is dependent on the particular application since conditions typically vary between wells, at different depths of individual wells, and even over time at a given location in an individual well. Advantageously, the method can be customized for individual wells and conditions. For example, a method of making a treatment composition useful for practicing the method disclosed herein may include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. A formulation may then be generated based at least in part on compatibility information concerning the fluorinated polymer, the solvent, the temperature, and at least one of the hydrocarbon composition or brine composition of the selected geological zone of the formation. In some embodiments, the compatibility information comprises information concerning phase stability of a mixture of the fluorinated polymer, the solvent, and a model brine composition, wherein the model brine composition is based at least partially on the brine composition of the geological zone of the formation. The phase stability of a solution or dispersion can be evaluated using the phase behavior evaluation described above. The phase behavior can be evaluated over an extended period of time (e.g., 1 hour, 12 hours, 24 hours, or longer) to determine if any precipitation or cloudiness is observed. In some embodiments, the compatibility information comprises information concerning solid (e.g., salts or asphaltenes) precipitation from a mixture of the fluorinated polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation. In addition to using a phase behavior evaluation, it is also contemplated that one may be able obtain the compatibility information, in whole or in part, by computer simulation or by referring to previously determined, collected, and/or tabulated information (e.g., in a handbook or a computer database).

Treatment of a near wellbore region of an oil and/or gas well that has at least one of brine or two phases of hydrocarbons in the near wellbore region using the methods disclosed herein may increase the productivity of the well. Advantageously, in many embodiments, the method of treating a hydrocarbon-bearing formation according to the present disclosure is useful for changing the wettability of a variety of materials found in hydrocarbon-bearing formations, including sandstone, limestone, and bauxite proppants. Thus, the method can be more versatile than other treatment methods which are effective with only certain substrates (e.g., sandstone). For example, nonionic fluorinated polymeric surfactants have been demonstrated to be useful for treating siliciclastic (e.g., sandstone) formations and fractured formations containing proppants (see, e.g., U.S. Pat. No. 7,585,817 (Pope et al.) and U.S. Pat. No. 8,043,998 (Pope et al.)). However, such surfactants have been shown to have limited effectiveness on limestone; (see, e.g., Comparative Example A in U.S. Pat. Appl. Pub. No. 2011/0136704 (Sharma et al.), the disclosure of which example is incorporated herein by reference). The hydrocarbon-bearing formations that may be treated according to the present disclosure may be siliciclastic (e.g., shale, conglomerate, diatomite, sand, and sandstone) or carbonate (e.g., limestone or dolomite) formations. In some embodiments, the hydrocarbon-bearing formation is predominantly sandstone (i.e., at least 50 percent by weight sandstone). In some embodiments, the hydrocarbon-bearing formation is predominantly limestone (i.e., at least 50 percent by weight limestone).

The method of treating a hydrocarbon-bearing formation according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

The method of treating a hydrocarbon-bearing formation according to the present disclosure may be equally well-suited for use in offshore and onshore operations and for vertical wells, deviated wells, inclined wells, and horizontal wells. In the field, contacting a hydrocarbon-bearing formation with a treatment composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be treated with the composition.

The method of treating a hydrocarbon-bearing formation according to the present disclosure can be useful, for example on both existing and new wells. Typically, it is believed to be desirable to allow for a shut-in time after treatment compositions described herein are placed in contact with the hydrocarbon-bearing formations. Exemplary shut-in times include a few hours (e.g., 1 to 12 hours), about 24 hours, or a few (e.g., 2 to 10) days. After the treatment composition has been allowed to remain in place for the desired time, the solvent present in the composition may be recovered from the formation by simply pumping fluids up tubing in a well as is commonly done to produce fluids from a formation.

In some embodiments of the method of treating a hydrocarbon-bearing formation according to the present disclosure, the method comprises treating the hydrocarbon-bearing formation with a fluid before treating the hydrocarbon-bearing formation with the treatment composition. In some embodiments, the fluid at least one of at least partially solubilizes or at least partially displaces the brine in the hydrocarbon-bearing formation. In some embodiments, the fluid at least partially solubilizes the brine. In some embodiments, the fluid at least partially displaces the brine. In some embodiments, the fluid at least one of at least partially solubilizes or displaces liquid hydrocarbons in the hydrocarbon-bearing formation. In some embodiments, the fluid is substantially free of fluorinated polymers. The term "substantially free of fluorinated polymers" refers to fluid that may have a fluorinated surfactant in an amount insufficient for the fluid to have a cloud point (e.g., when it is below its critical micelle concentration). A fluid that is substantially free of fluorinated polymer may be a fluid that has a fluorinated polymer but in an amount insufficient to alter the wettability of, for example, a hydrocarbon-bearing formation under downhole conditions. A fluid that is substantially free of fluorinated polymer includes those that have a weight percent of such polymers as low as 0 weight percent. The fluid may be useful for decreasing the concentration of at least one of the salts present in the brine before introducing the treatment composition to the hydrocarbon-bearing formation. The change in brine composition may change the results of a phase behavior evaluation (e.g., the combination of a treatment composition with a first brine before the fluid preflush may result in precipitation of salt or the fluorinated polymer while the combination of the treatment composition with the brine after the fluid preflush may result in no precipitation.) In some embodiments of the method of treating a hydrocarbon-bearing formation disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or 2 to 6 carbon atoms. In some embodiments, useful polyol ethers may have from 3 to 25 carbon atoms, 3 to 20, 3 to 15, 3 to 10, 3 to 8, or from 5 to 8 carbon atoms. Exemplary useful polyols and polyol ethers include any of those described above for solvents. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the methods and treated hydrocarbon-bearing formations disclosed herein, the hydrocarbon-bearing formation has at least one fracture. In some embodiments, fractured formations have at least 2, 3, 4, 5, 6, 7, 8, 9, or 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments, wherein treating the formation with the treatment composition provides an increase in at least one of the gas permeability or the liquid permeability of the formation, the formation is a non-fractured formation (i.e., free of man-made fractures made, for example, by hydraulic fracturing). Advantageously, methods disclosed herein typically provide an increase in at least one of the gas permeability or the hydrocarbon liquid permeability of the formation without fracturing the formation.

In some embodiments wherein the hydrocarbon-bearing formation has at least one fracture, the fracture has a plurality of proppants therein. Before delivering the proppants into a fracture, the proppants may be treated with a composition according to and/or made according to the present disclosure or may be untreated (e.g., may comprise less than 0.1% by weight fluorinated polymer and/or non-fluorinated polymer, based on the total weight of the plurality of proppants). In some embodiments, the composition according to and/or made according to the present disclosure is adsorbed on at least a portion of the plurality of proppants.

Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Proppants useful in practicing the present disclosure may have a particle size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore or formation as part of a sand control treatment such as a gravel pack or frac pack.

In some embodiments, methods according to the present disclosure include treating the hydrocarbon-bearing formation with the treatment composition at least one of during fracturing or after fracturing the hydrocarbon-bearing formation. In some of these embodiments, the fracturing fluid, which may contain proppants, may be aqueous (e.g., a brine) or may contain predominantly organic solvent (e.g., an alcohol or a hydrocarbon). In some embodiments, it may be desirable for the fracturing fluid to include contain viscosity enhancing agents (e.g., polymeric viscosifiers), electrolytes, corrosion inhibitors, scale inhibitors, and other such additives that are common to a fracturing fluid.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be treated with the treatment composition.

In some embodiments, wherein the formation treated according to the methods described herein has at least one fracture, the fracture has a conductivity, and after the treatment composition treats at least one of the fracture or at least a portion of the plurality of proppants, the conductivity of the fracture is increased (e.g., by 25, 50, 75, 100, 125, 150, 175, 200, 225, 250, 275, or by 300 percent).

Compositions including a fluorinated polymer and a non-fluorinated polymer according to and/or made according to the present disclosure may also be useful, for example, for treating proppants before using the proppants in a fracturing and propping operation. Treated proppants may be prepared, for example, by dissolving or dispersing the composition disclosed herein in a dispersing medium (e.g., water and/or organic solvent (e.g., alcohols, ketones, esters, alkanes and/or fluorinated solvents (e.g., hydrofluoroethers and/or perfluorinated carbons)) that is then applied to the proppant particles. Optionally, a catalyst can be added (e.g., a Lewis acid or Lewis base). The amount of liquid medium used should be sufficient to allow the solution or dispersion to generally evenly wet the proppants being treated. Typically, the concentration of the fluorinated polymer in the solution or dispersion is the range from about 5% to about 20% by weight, although amounts outside of this range may also be useful. The proppants are typically treated with the solution or dispersion at temperatures in the range from about 25° C. to about 50° C., although temperatures outside of this range may also be useful. The solution or dispersion can be applied to the proppants using techniques known in the art for applying solutions or dispersions to proppants (e.g., mixing the solution or dispersion and proppants in a vessel (in some embodiments under reduced pressure) or spraying the solutions or dispersions onto the particles). After application of the solution or dispersion to the particles, the liquid medium can be removed using techniques known in the art (e.g., drying the particles in an oven). Typically, about 0.1 to about 5 (in some embodiments, for example, about 0.5 to about 2) percent by weight fluorinated polymer is added to the particles, although amounts outside of this range may also be useful.

Compositions according to and/or made according to the present disclosure may be useful in a number of other applications. For example, the compositions may be useful as industrial coating additives to provide better wetting and/or leveling of a coating (e.g., a waterborne coating) to a substrate surface or better dispersability of a component (e.g., a thickening agent or pigment) within the coating formulation.

When used in waterborne formulations, (e.g., for industrial coatings), compositions according to and/or made according to the present disclosure can be formulated into an aqueous solution or dispersion at a final concentration, for example, of about 0.001 to about 1 weight percent (wt. %), about 0.001 to about 0.5 wt. %, or about 0.01 to about 0.3 wt. %, based on the weight of the solution or dispersion.

Waterborne formulations (e.g., for industrial coatings) can also include at least one other polymeric material, typically a film-forming polymer. Examples of suitable polymers include acrylic polymers, (e.g., poly(methyl methacrylate-co-ethyl acrylate) or poly(methyl acrylate-co-acrylic acid)); polyurethanes, (e.g., reaction products of aliphatic, cycloaliphatic or aromatic diisocyanates with polyester glycols or polyether glycols); polyolefins, (e.g., polystyrene); copolymers of styrene with acrylate(s) (e.g., poly(styrene-co-butyl acrylate); polyesters, (e.g, polyethylene terephthalate, polyethylene terephthalate isophthalate, or polycaprolactone); polyamides, (e.g., polyhexamethylene adipamide); vinyl polymers, (e.g., poly(vinyl acetate/methyl acrylate), poly (vinylidene chloride/vinyl acetate); polydienes, (e.g., poly (butadiene/styrene)); cellulosic derivatives including cellulose ethers and cellulose esters, (e.g., ethyl cellulose, or cellulose acetate/butyrate), urethane-acrylate copolymers, and combinations thereof. Methods and materials for preparing aqueous emulsions or latexes of such polymers are well known, and many are widely available from commercial sources. In some embodiments, the present disclosure provides a formulation comprising water, a polymeric material, and a composition according to, or made by a method according to, the present disclosure, wherein the polymeric material is selected from the group consisting of an acrylic polymer, a polyurethane, polystyrene, and a copolymer of styrene and at least one acrylate.

Waterborne formulations may also contain one or more cosolvents (e.g., coalescing solvents) including ethers of polyhydric alcohols (e.g., ethylene glycol monomethyl (or monoethyl) ether, diethylene glycol methyl (or ethyl) ether, triethylene glycol monomethyl (or monoethyl) ether, 2-butoxyethanol (i.e., butyl cellusolve), or di(propylene glycol) methyl ether (DPM)); alkylene glycols and polyalkylene glycols (e.g., ethylene glycol, propylene glycol, butylene glycol, triethylene glycol, hexylene glycol, diethylene glycol, polyethylene glycol, polypropylene glycol); and 2,2,4-trimethyl-1,3-pentanediol monoisobutyrate (an ester alcohol available from Eastman Chemical Company, Kingsport, Tenn., under the trade designation "TEXANOL"). Other water-miscible organic solvents that may be added to a formulation include alcohols having 1 to 4 carbon atoms (e.g., methanol, ethanol, isopropanol, or isobutanol); amides and lactams, (e.g., N,N-dimethylformamide, N,N-dimethylacetamide, or N-methylpyrrolidone); ketones and ketoalcohols (e.g., acetone, cyclohexanone, methyl isobutyl ketone, diacetone alcohol); ethers (e.g., tetrahydrofuran or dioxane); 1,3-dimethyl-2-imidazolidinone; and combinations thereof.

Depending on the application, waterborne formulations may also include at least one additive (e.g., biocides, fillers, additional leveling agents, emulsifiers, defoamers, anticorrosive agents, dispersants, or rust inhibitors). The formulation may also optionally contain at least one pigment.

When a waterborne formulation is applied to a substrate, water and solvent evaporate, and the polymer particles coalesce to form a continuous film. Waterborne formulations are typically applied, dried, and optionally heated, leaving the finished product with a solid coating. The addition of compositions according to and/or made according to the present disclosure may improve the film forming properties of some formulations by improving the ability of the coating to wet the substrate and/or by allowing for even evaporation of the water (i.e., leveling) during film formation.

Waterborne coating formulations that may be improved by the addition of compositions according to and/or made according to the present disclosure include floor polishes and finishes, varnishes for a variety of substrates (e.g., wood floors), waterborne gels applied in the manufacture of photographic film, automotive or marine coatings (e.g., primers, base coats, or topcoats), sealers for porous substrates (e.g., wood, concrete, or natural stone), hard coats for plastic lenses, coatings for metallic substrates (e.g., cans, coils, electronic components, or signage), inks (e.g, for pens or gravure, screen, or thermal printing), and coatings used in the manufacture of electronic devices (e.g., photoresist inks). The formulations may be clear or pigmented.

Waterborne coating formulations may be applied by many methods known to one of skill in the art (e.g., brushing, mopping, bar coating, spraying, dip coating, gravure coating, or roll coating).

Compositions according to and/or made according to the present disclosure may be useful in alkaline waterborne coating formulations, such as amine-stabilized floor finish formulations.

Compositions according to and/or made according to the present disclosure may also be useful as additives in cleaning solutions and may provide improved wetting of the surface and/or the contaminants to be removed. A cleaning solution is typically formulated to include about 0.001 to about 1 wt. %, or about 0.001 to about 0.5 wt. % surfactant, based on the weight of the cleaning solution. For hard-surface cleaning, a cleaning solution is sprayed (e.g., from a spray bottle) or otherwise applied to a hard surface such as window glass, a mirror, or ceramic tile, and the surface is wiped clean with a paper or fabric wipe. The contaminated part may also be immersed or dipped into the cleaning solution. For cleaning solutions used in the manufacture of electronic materials, the solution is typically placed in a bath, and electronic parts are either dipped or run through the bath on a conveyor belt.

In any of the aforementioned coating or cleaning-solution formulations, compositions according to and/or made according to the present disclosure can be used individually or in combination with other surfactants (e.g., hydrocarbon, silicone surfactants, or fluorinated surfactants) to produce the desired surface tension reduction or wetting improvement. Useful auxiliary surfactants may be found, for example, in Industrial Applications Of Surfactants, D. R. Karsa, Ed., Royal Society of Chemistry, London, and M. Rosen, Surfactants and Interfacial Phenomena, Wiley-Interscience, New York.

Some Embodiments of the Disclosure

In a first embodiment, the present disclosure provides a composition comprising a fluorinated polymer and a non-fluorinated polymer, wherein the fluorinated polymer comprises:

first divalent units independently represented by formula:

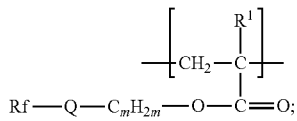

and second divalent units independently comprising a pendent cationic, anionic, amphoteric, or amine oxide group or a pendent poly(alkyleneoxy) segment, wherein the second divalent units are present in the fluorinated polymer in an amount such that the fluorinated polymer and the non-fluorinated polymer form a solution or dispersion;

wherein

Rf represents a fluoroalkyl group having from 1 to 8 carbon atoms or Rf represents a polyfluoroether group;

each $R^1$ is independently hydrogen or methyl;

Q is a bond, $-SO_2-N(R)-$, or $-C(O)-N(R)-$, wherein R is alkyl having from 1 to 4 carbon atoms or hydrogen; and m is an integer from 1 to 11, wherein the fluorinated polymer has not more than 2.5 percent by weight units represented by formula:

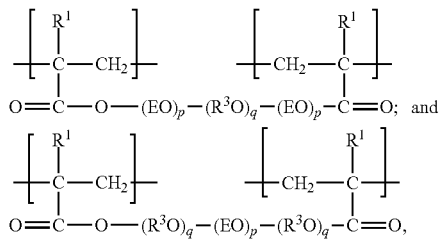

and wherein the non-fluorinated polymer is represented by formula $R^2O$-$(EO)_p$—$(R^3O)_q$-$(EO)_p$—$R^2$ or $R^2O$—$(R^3O)_q$-$(EO)_p$—$(R^3O)_q$—$R^2$, wherein $R^2$ is hydrogen or alkyl having from 1 to 4 carbon atoms;

EO represents $-CH_2CH_2O-$;

each $R^3O$ is independently selected from the group consisting of $-CH(CH_3)CH_2O-$, $-CH_2CH_2CH_2O-$, $-CH_2CH(CH_3)O-$, $-CH_2CH_2CH_2CH_2O-$, $-CH(CH_2CH_3)CH_2O-$, $-CH_2CH(CH_2CH_3)O-$, and $-CH_2C(CH_3)_2O-$;

each p is independently 1 to 150; and each q is independently 0 to 150, wherein p+q is at least 5.

In a second embodiment, the present disclosure provides the composition of the first embodiment, wherein Q is $-SO_2N(R)-$.

In a third embodiment, the present disclosure provides the composition of the first or second embodiment, wherein Rf represents a perfluoroalkyl group having up to 6 carbon atoms.

In a fourth embodiment, the present disclosure provides the composition of any one of the first to third embodiments, wherein at least one of the second divalent units is represented by formula:

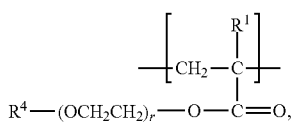

wherein
each R' is independently hydrogen or methyl;
each $R^4$ is independently alkyl having from 1 to 4 carbon atoms; and
r is in a range from 1 to 50.

In a fifth embodiment, the present disclosure provides the composition of any one of the first to fourth embodiments, wherein at least one of the second divalent units is represented by formula:

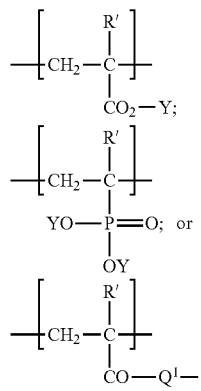

wherein
$Q^1$ is selected from the group consisting of —O—, —S—, and —N($R^7$)—;
each $R^7$ is independently selected from the group consisting of hydrogen and alkyl having from 1 to 4 carbon atoms;
each R' is independently hydrogen or methyl;
V is alkylene that is optionally interrupted by at least one ether linkage or amine linkage;
Z is selected from the group consisting of —P(O)(OY)$_2$, —O—P(O)(OY)$_2$, —SO$_3$Y, and CO$_2$Y; and
each Y is independently selected from the group consisting of hydrogen and a counter cation.

In a sixth embodiment, the present disclosure provides the composition of any one of the first to fifth embodiments, wherein at least one of the second divalent units is represented by formula:

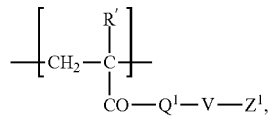

wherein
$Q^1$ is selected from the group consisting of —O—, —S—, and —N($R^7$)—;
each $R^7$ is independently selected from the group consisting of hydrogen and alkyl having from 1 to 4 carbon atoms;
each R' is independently hydrogen or methyl;
V is alkylene that is optionally interrupted by at least one ether linkage or amine linkage; and
$Z^1$ is selected from the group consisting of —[N($R^8$)$_3$]$^+$ M$^-$, —N$^+$(OY$^1$)(R$^9$)$_3$, —N$^+$(R$^8$)$_2$—(CH$_2$)$_g$—SO$_3$Y$^1$, and —N$^+$(R$^8$)$_2$—(CH$_2$)$_g$—CO$_2$Y, wherein
each $R^8$ is independently selected from the group consisting of hydrogen and alkyl having from 1 to 6 carbon atoms;
each $R^9$ is independently selected from the group consisting of hydrogen and alkyl having from 1 to 6 carbon atoms, wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms;
each g is independently an integer from 2 to 6;
M$^-$ is a counter anion; and
$Y^1$ is selected from the group consisting of hydrogen and a free anion.

In a seventh embodiment, the present disclosure provides the composition any one of the first to sixth embodiments, wherein the pendent poly(alkyleneoxy) segment has a number average molecular weight of up to 1000 grams per mole, and wherein the non-fluorinated polymer has a number average molecular weight of greater than 1000 grams per mole.

In an eighth embodiment, the present disclosure provides the composition of any one of the first to seventh embodiments, wherein each $R^2$ is hydrogen.

In a ninth embodiment, the present disclosure provides the composition of any one of the first to eighth embodiments, wherein the composition is essentially free of volatile organic solvent.

In a tenth embodiment, the present disclosure provides the composition of any one of the first to ninth embodiments, further comprising a grafted polymer comprising the non-fluorinated polymer and the fluorinated polymer grafted together.

In an eleventh embodiment, the present disclosure provides the composition of any one of the first to tenth embodiments, wherein the composition comprises at least 10 percent by weight of the non-fluorinated polymer, based on the total weight of the composition.

In a twelfth embodiment, the present disclosure provides a method of making a composition, the method comprising:
combining components comprising a fluorinated monomer represented by formula Rf-Q-C$_m$H$_{2m}$—O—C(O)—C(R$^1$)=CH$_2$, at least one second monomer having a pendent cationic, anionic, amphoteric, or amine oxide group or a pendent poly(alkyleneoxy) segment, a non-fluorinated polymer represented by formula R$^2$O-(EO)$_p$—(R$^3$O)$_q$-(EO)$_p$—R$^2$ or R$^2$O—(R$^3$O)$_q$-(EO)$_p$—(R$^3$O)$_q$—R$^2$, a free-radical initiator, and not more than 2.5 percent by weight of a monomer represented by formula CH$_2$=C(R$^1$)—C(O)—O-(EO)$_p$—(R$^3$O)$_q$-(EO)$_p$—C(O)—C(R$^1$)=CH$_2$ or CH$_2$=C(R$^1$)—C(O)—O—(R$^3$O)$_q$-(EO)$_p$—(R$^3$O)$_q$—C(O)—C(R$^1$)=CH$_2$, based on the total weight of the monomers;
wherein
Rf represents a fluoroalkyl group having from 1 to 8 carbon atoms or Rf represents a polyfluoroether group;
each $R^1$ is independently hydrogen or methyl;
Q is a bond, —SO$_2$—N(R)—, or —C(O)—N(R)—, wherein R is alkyl having from 1 to 4 carbon atoms or hydrogen;
m is an integer from 1 to 11,
EO represents —CH$_2$CH$_2$O—;

each $R^3O$ is independently selected from the group consisting of —CH(CH$_3$)CH$_2$O—, —CH$_2$CH$_2$CH$_2$O—, —CH$_2$CH(CH$_3$)O—, —CH$_2$CH$_2$CH$_2$CH$_2$O—, —CH(CH$_2$CH$_3$)CH$_2$O—, —CH$_2$CH(CH$_2$CH$_3$)O—, and —CH$_2$C(CH$_3$)$_2$O—;

each p is independently 0 to 150; and each q is independently 0 to 150, wherein p+q is at least 5, and $R^2$ is hydrogen or alkyl having from 1 to 4 carbon atoms; and copolymerizing the fluorinated monomer and the at least one second monomer, wherein the at least one second monomer is present in an amount sufficient such that the fluorinated polymer and the non-fluorinated polymer form a solution or dispersion.

In a thirteenth embodiment, the present disclosure provides the method of the twelfth embodiment, wherein the components combined are essentially free of volatile organic solvent.

In a fourteenth embodiment, the present disclosure provides the method of the twelfth or thirteenth embodiment, wherein the at least one second monomer is represented by formula CH$_2$=C(R')C(O)O(CH$_2$CH$_2$O)R$^4$, wherein R' is hydrogen or methyl; each $R^4$ is independently alkyl having from 1 to 4 carbon atoms; and r is in a range from 1 to 50.

In a fifteenth embodiment, the present disclosure provides the method of any one of the twelfth to fourteenth embodiments, wherein the at least one second monomer is represented by formula $Z^1$—V-$Q^1$C(O)—C(R')=CH$_2$, wherein $Q^1$ is selected from the group consisting of —O—, —S—, and —N(R$^7$)—;

each $R^7$ is independently selected from the group consisting of hydrogen and alkyl having from 1 to 4 carbon atoms;

each R' is independently hydrogen or methyl;

V is alkylene that is optionally interrupted by at least one ether linkage or amine linkage; and $Z^1$ is selected from the group consisting of —[N(R$^8$)$_3$]$^+$ M$^-$, —N$^+$(OY$^1$)(R$^9$)$_3$, —N$^+$(R$^8$)$_2$—(CH$_2$)$_g$—SO$_3$Y$^1$, and —N$^+$(R$^8$)$_2$—(CH$_2$)$_g$—CO$_2$Y, wherein each $R^8$ is independently selected from the group consisting of hydrogen and alkyl having from 1 to 6 carbon atoms;

each $R^9$ is independently selected from the group consisting of hydrogen and alkyl having from 1 to 6 carbon atoms, wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms;

each g is independently an integer from 2 to 6;

M$^-$ is a counter anion; and $Y^1$ is selected from the group consisting of hydrogen and a free anion.

In a sixteenth embodiment, the present disclosure provides the method of any one of the twelfth to fifteenth embodiments, wherein the at least one second monomer is represented by formula YOOC—C(R')=CH$_2$, (YO)$_2$(O)P—C(R')=CH$_2$, or Z—V-Q$^1$C(O)—C(R')=CH$_2$, wherein $Q^1$ is selected from the group consisting of —O—, —S—, and —N(R$^7$)—;

each $R^7$ is independently selected from the group consisting of hydrogen and alkyl having from 1 to 4 carbon atoms;

each R' is independently hydrogen or methyl;

V is alkylene that is optionally interrupted by at least one ether linkage or amine linkage;

Z is selected from the group consisting of —P(O)(OY)$_2$, —O—P(O)(OY)$_2$, —SO$_3$Y, and CO$_2$Y; and each Y is independently selected from the group consisting of hydrogen and a counter cation.

In a seventeenth embodiment, the present disclosure provides the method of any one of the twelfth to sixteenth embodiments, wherein the components comprise at least 10 percent by weight of the non-fluorinated polymer, based on the total weight of the components.

In an eighteenth embodiment, the present disclosure provides the method of any one of the twelfth to seventeenth embodiments, wherein Rf represents a perfluoroalkyl group having up to 6 carbon atoms.

In a nineteenth embodiment, the present disclosure provides the method of any one of the twelfth to eighteenth embodiments, wherein Q is —SO$_2$N(R)— and/or wherein each $R^2$ is hydrogen.

In a twentieth embodiment, the present disclosure provides the method of any one of the twelfth to nineteenth embodiments, wherein the pendent poly(alkyleneoxy) segment has a number average molecular weight of up to 1000 grams per mole, and wherein the non-fluorinated polymer has a number average molecular weight of greater than 1000 grams per mole.

In a twenty-first embodiment, the present disclosure provides a method of reducing the surface tension of a liquid, the method comprising combining the liquid with the composition of any one of the first to eleventh embodiments or a composition made by the method of any one of the twelfth to twentieth embodiments to reduce the surface tension of the liquid.

In a twenty-second embodiment, the present disclosure provides a method of treating a hydrocarbon-bearing formation, the method comprising contacting a hydrocarbon-bearing formation with a treatment composition comprising solvent and the composition of any one of the first to eleventh embodiments or a composition made by the method of any one of the twelfth to twentieth embodiments.

In a twenty-third embodiment, the present disclosure provides the method of the twenty-second embodiment, wherein the hydrocarbon-bearing formation comprises at least one of limestone, dolomite, sandstone, shale, conglomerate, diatomite, or sand.

In a twenty-fourth embodiment, the present disclosure provides the method of the twenty-second or twenty-third embodiment, wherein the hydrocarbon-bearing formation has at least one fracture, and wherein the fracture has a plurality of proppants therein.

In a twenty-fifth embodiment, the present disclosure provides the method of the twenty-fourth embodiment, wherein the plurality of proppants comprises ceramic proppants.

In a twenty-sixth embodiment, the present disclosure provides the method of the twenty-second or twenty-third embodiment, wherein the method does not include intentionally fracturing the hydrocarbon-bearing formation.

In a twenty-seventh embodiment, the present disclosure provides the method of the twenty-second or twenty-third embodiment, wherein the hydrocarbon-bearing formation is free of manmade fractures.

In a twenty-eighth embodiment, the present disclosure provides the method of any one of the twenty-second to twenty-seventh embodiments, wherein the solvent comprises at least one of water, an alcohol, an ether, or a ketone, wherein the alcohol, ether, and ketone each independently have up to 4 carbon atoms.

In a twenty-ninth embodiment, the present disclosure provides the method of any one of the twenty-second to twenty-eighth embodiments, wherein the solvent comprises at least one of a polyol or polyol ether independently having from 2 to 25 carbon atoms.

In a thirtieth embodiment, the present disclosure provides the method of any one of the twenty-second to twenty-ninth embodiments, wherein before contacting the hydrocarbon-bearing formation with the treatment composition, the hydrocarbon-bearing formation has at least one of brine or liquid hydrocarbons, and wherein the hydrocarbon-bearing formation has at least a gas permeability that is increased after it is contacted with the treatment composition.

In a thirty-first embodiment, the present disclosure provides the method of any one of the twenty-second to thirtieth embodiments, further comprising contacting the hydrocarbon-bearing formation with a fluid before contacting the hydrocarbon-bearing formation with the treatment composition, wherein the fluid at least one of at least partially solubilizes or partially displaces at least one of the brine or liquid hydrocarbons in the hydrocarbon-bearing formation.

In a thirty-second embodiment, the present disclosure provides the method of any one of the twenty-second to thirty-first embodiments, wherein the hydrocarbon-bearing formation is penetrated by a wellbore, and wherein a region near the wellbore is contacted with the treatment composition.

In a thirty-third embodiment, the present disclosure provides a hydrocarbon-bearing formation treated according to the method of any one of the twenty-second to thirty-second embodiments.

In a thirty-fourth embodiment, the present disclosure provides a plurality of proppants treated with the composition of any one of the first to eleventh embodiments or a composition made by the method of any one of the twelfth to twentieth embodiments.

Embodiments of the methods disclosed herein are further illustrated by the following examples, but the particular materials and amounts thereof recited in these examples, as well as other conditions and details, should not be construed to unduly limit this invention.

EXAMPLES

In the following examples and comparative examples all %, weight %, and % by weight values are based on the total weight of the particular composition unless otherwise indicated. Unless otherwise noted, all parts, percentages, ratios, etc. in the examples and the rest of the specification are by weight.

Surface Tension Determination

All surface tensions were determined using a Kruss K12 Tensiometer. It was integrated with an automatic dosimat and a computer, using a software package for dynamic contact angle (K121). The program was run using a Wilhelmy platinum plate (PL12) and glass sample vessel (GL7). All parts referenced above including instrument and computer can be purchased directly from Kruss USA, 9305 Monroe Road, Suite B, Charlotte, N.C. After the samples were completed dissolved, the plate was cleaned with deionized water and dried for a few seconds using a propane flame torch. The plate was inserted about 0.5 mm from the surface of the liquid. The Kruss tensiometer took a series of five surface tension measurements and the result reported was the average of the five measurements.

Surface tensions in water were measured at 0.5% concentration in deionized water unless otherwise indicated. The composition including the fluorinated polymer and the non-fluorinated polymer was added to deionized water and stirred until clear. Surface tensions in an organic solvent were measured at 0.5% concentration in a 3000 molecular weight polypropylene oxide based triol commercially available from Bayer Corp., Pittsburgh, Pa. under the trade name "ARCOL POLYOL LG-56".

Materials

| | |
|---|---|
| MPD | mercaptopropanediol, chain transfer agent, available from Aldrich Chemcial, Milwaukee, WI |
| Acrylic acid | Acrylic acid, available from Dow Chemical Co., Midland, MI |
| DMAEA MCl | 75% in water dimethylaminoethyl acrylate methyl chloride quaternary, available from BASF, Ludwigshafen, Germany |
| EEEA | ethoxyethoxyethyl acrylate, available from Osaka Organic Chemical, Japan |
| PEG 400 acrylate | methoxy polyethyleneglycol 400 acrylate, available from Kowa Company, Tokyo, Japan under the trade name "AM-90G". |
| A5 | Prepared as described in Example 17 "Acrylate preparation" of U.S. Pat. No. 3,728,151 but with 750 molecular weight polyethyleneglycol monomethyl ether reacted with the acrylic acid. |
| Initiator 1 | t-butyl peroxy-2-ethylhexanoate available from Akzo Nobel, Amsterdam, the Netherlands |
| Initiator 2 | Commercially available from DuPont, Wilmington, DE under the trade designation "VAZO-67" |
| MeFBSEA | $C_4F_9SO_2N(CH_3)CH_2CH_2OC(=O)CH=CH_2$, prepared as described in Example 2, Parts A & B, of U.S. Pat. No. 6,492,477, with the modification to Part B described below |
| C6A | 1H,1H,2H,2H perfluorooctylacrylate (C6 telomer acrylate, available from ABCR, Germany) |
| PPEA | $CF_3OCF_2CF_2CF_2OCF_2OC(O)CH=CH_2$ prepared as described in Preparation 2 of U.S. Pat. Appl. Pub. No. 2010/0179262 (Dams et al.). |
| HFPOA | HFPO-acrylate made according to the procedures described in U.S. Pat. No. 7,722,955, column 12, line 30-55 (for the alcohol) and further column 14, line 1-15 (for the acrylate) |
| S1 | Nonionic surfactant block copolymer of ethylene oxide and propylene oxide available from BASF, Ludwigshafen, Germany under the trade designation "PLURONIC L44" |
| S2 | Nonionic surfactant block copolymer of ethylene oxide and propylene oxide available from BASF, Ludwigshafen, Germany under the trade designation "PLURONIC L43" |

Core Flood Evaluation

Treatment solutions were diluted to 2 wt % in ethanol and 2-butoxy ethanol (30:70 ratio).

Unless otherwise indicated 20 cm×2.5 cm (8 in×1 in) core samples were cut from a sandstone block obtained from Cleveland Quarries, Vermillion, Ohio, under the trade designation "BEREA SANDSTONE". Each core had a pore volume of about 16-17 mL and a porosity of about 18% as measured by core dimension and gravity.

A schematic diagram of a core flood apparatus 100 used to determine relative permeability of a substrate sample (i.e., core) is shown in FIG. 1. The core flood apparatus 100 included a positive displacement pump 102 (Model D-100 obtained from ISCO, Lincoln, Nebr.) to inject at constant flow rates to the accumulator 116 (CFR-Series obtained from TEMCO, Inc, Tulsa, Okla.). A testing fluid ($N_2$, gas condensate, or treatment solution) was delivered from the accumulator 116 into the core. The pressure in the accumulator 116 was controlled and maintained by an upstream back pressure regulator 106 (Model BPR-100 obtained from TEMCO, Inc., Tulsa, Okla.). Pressure ports 112 on high-pressure core holder 108 (Hassler-type Model RCHR-1.0 obtained from Temco, Inc., Tulsa, Okla.) were used to measure pressure drop across the vertical core 109 by a differential pressure regulator 111 (Rosemount Model 3051S obtained from Rosemount, Chanhassen, Minn.). The core pressure was regulated by a downstream backpressure regulator 104 (Model BPR-100 obtained from TEMCO, Inc., Tulsa, Okla.). The pressures of back pressure regulators 104, 106 were measured at pressure ports P104, P106. The accumulator 116, the backpressure regulators 106, 104, and the coreholder 108 were all installed in an oven 110 (Despatch Model RFD2-19-2E obtained from Despatch, Lakeville, Minn.).

For each evaluation, the core was dried for 72 hrs in a standard laboratory oven at 95° C. and then wrapped in aluminum foil and heat shrink tubing. The wrapped core was then inserted into a fluorinated elastomer core sleeve and mounted onto the coreholder. An overburden pressure of 1000 psi ($6.9 \times 10^6$ Pa) over the core pressure was applied in the coreholder 108.

The absolute permeability of the core was measured with nitrogen at 20° C. with at least 4 different flow rates to obtain an average. After the absolute permeability measurement, 3% KCl brine was introduced to the core by the following procedure to establish a saturation of 30%. The outlet end of the core holder was connected to a vacuum pump and a full vacuum was applied for 30 minutes with the inlet closed. The inlet was connected to a burette with the water in it. The outlet was closed and the inlet was opened to allow the brine to flow into the core. The inlet and the outlet valves were then closed and the brine was allowed to distribute in the core overnight at 250° F. (121° C.). A synthetic gas condensate was prepared by weighing each component into an accumulator 116. The gas condensate was then placed into the oven 110 on a pneumatically controlled rocker allowing it to reach equilibrium for overnight.

Gas condensate was injected into the core 109 at a constant pump rate of 3.00 mL/minute. The upstream back pressure regulator 106 was set at 5000 psi ($3.4 \times 10^7$ Pa), and the downstream back pressure regulator was set at 1500 psi ($1.0 \times 10^7$ Pa). The injection was continued until a steady state was reached. The gas relative permeability before treatment was then calculated from the steady state pressure drop. The treatment composition was injected at 1 mL/minute for about 20 pore volumes. The treatment solution was shut in the core 109 overnight at 250° F. (121° C.) before the post treatment gas condensate flood. The post treatment gas condensate flood was done at the same conditions as the pre-treatment. The gas relative permeability after treatment was then calculated from the steady state pressure drop.

$K_r^g$ and $K_r^o$ are the relative permeabilities in gas and oil respectively. Q is the flow rate and the improvement ratio is the ratio of the post treatment relative permeability to the pre treatment relative permeability.

Reference Examples

Surface tension values in deionized water were measured for the two nonionic surfactants S1 and S2. The surfactants at 0.5% by weight in water were clear solutions. The surface tension values measured for S1 and S2 were 42.9 dyn/cm and 42.4 dyn/cm, respectively.

Example 1

S1 (39.0 g), melted MeFBSEA (9.0 g), acrylic acid (2.0 g), Initiator 1 (1.00 g, 50% solids) and MPD (1.50 g) were added to a 118-mL (4-ounce) clear bottle. This solution was degassed with nitrogen and sealed. The bottle was placed in a water bath at 80° C. and tumbled for 16 hours. Surface tension was measured and reported in Table 1.

Comparative Examples CE1 and CE2

Comparative Examples CE1 and CE2 were prepared using the procedure of Example 1 except no acrylic acid was used. For CE 1 the weight ratio of S1 to MeFBSEA was 78:22, and for CE2, the weight ratio of S2 to MeFBSEA was 78:22. For both of these Comparative Examples, a lump of polymer formed in a hazy solution. The surface tension was not measured.

Examples 2 to 20

Examples 2 to 20 were made on the same scale per the procedure of Example 1 but with the formulations as shown in Table 1. The exception was Example 4 which used Initiator 2 in place of Initiator 1 and 70° C. instead of 80° C. for the polymerization. Note that for convenience the relative weight ratios in Table 1 exclude initiator and MPD. However, the amounts of these were the same in these examples and comparatives as in Example 1.

Example 21

Into a three necked 250 mL flask fitted with a stirrer, condenser, heating mantle and thermometer were placed 20 g MeFBSEA, 40 g A5, 40 g of S1, 3 g MPD, and 0.75 g Initiator 2. The mixture was degassed three times using aspirator vacuum and nitrogen pressure and then heated up to 75° C. for six hours. An additional 0.2 g of Initiator 2 was added and the reaction continued for 16 hours at 75° C. under nitrogen to provide a clear solution. The sample was then diluted in water to 1000 ppm, and the surface tension of the resulting clear solution was measured to be 22.4 dyn/cm.

Comparative Example CE3

Comparative Example CE was prepared using the method of Example 21 with the modification that no A5 was used. The weight ratio of S1 to MeFBSEA was 80:20. A lump of polymer formed in a hazy solution. The mixture was insoluble in water, and the surface tension was not measured.

Example 22

Example 22 was prepared using the method of Example 21 with the exception that PEG 400 acrylate was used instead of A5. The sample was then diluted in water to 1000 ppm, and the surface tension of the resulting clear solution was measured to be 20.7 dyn/cm.

Example 23

Example 23 was prepared using the method of Example 21 with the exception that C6A was used instead of MeFBSEA. The sample was then diluted in water to 1000 ppm, and the surface tension of the resulting clear solution was measured to be 20.2 dyn/cm.

Example 24

Example 24 was prepared using the method of Example 21 with the exception that HFPOA was used instead of MeFBSEA. The sample was then diluted in water to 1000 ppm, and the surface tension of the resulting clear solution was measured to be 20.6 dyn/cm.

Example 25

Example 25 was prepared using the method of Example 21 with the exception that 5 g HFPOA was used instead of 20 g MeFBSEA, and 55 g A5 were used. The sample was then diluted in water to 1000 ppm, and the surface tension of the resulting very hazy solution was measured to be 23.1 dyn/cm.

Example 26

S1 (34.0 g), melted MeFBSEA (11.0 g), 5.0 g EEEA, Initiator 1 (1.5 g), and MPD (2.0 g) were added to a 118-mL (4-ounce) clear bottle. This solution was degassed with nitrogen and sealed. The bottle was placed in a water bath at 80° C. and tumbled for 16 hours. Surface tension was measured and reported in Table 1.

TABLE 1

| EX | S1 | S2 | MeFBSEA | AA | DMEA MCl | EEEA | PEG 400 A | **Surface tension dyn/cm | Observation of Reaction Product |
|---|---|---|---|---|---|---|---|---|---|
| EX 1 | 78 | 0 | 18 | 4 | 0 | 0 | 0 | [3]25.2 | Slightly hazy |
| EX 2 | 0 | 85 | 5 | 0 | 0 | 10 | 0 | [3]24.7 | Hazy |
| EX 3 | 0 | 45 | 20 | 0 | 0 | 35 | 0 | [4]24.7 | Very hazy |
| EX 4 | 0 | 48 | 22 | 0 | 0 | 30 | 0 | [4]24.4 | Slightly hazy |
| EX 5 | 0 | 36 | 24 | 0 | 0 | 40 | 0 | [3]23.0 | Clear |
| EX 6 | 0 | 34 | 26 | 0 | 0 | 40 | 0 | [3]22.9 | Clear |
| EX 7 | 0 | 32 | 28 | 0 | 0 | 40 | 0 | [3]22.8 | Clear |
| EX 8 | 0 | 30 | 30 | 0 | 0 | 40 | 0 | [3]23.0 | Clear |
| EX 9 | 0 | 20 | 35 | 0 | 0 | 45 | 0 | [3]22.3 | Clear |
| EX 10 | 0 | 10 | 40 | 0 | 0 | 50 | 0 | [3]23.7 | Clear |
| EX 11 | 0 | 80 | 5 | 0 | 0 | 0 | 15 | [1]22.1 (23.2) | Clear |
| EX 12 | 0 | 65 | 10 | 0 | 0 | 0 | 25 | [1]22.6 (23.2) | Clear |
| EX 13 | 0 | 50 | 15 | 0 | 0 | 0 | 35 | [1]23.4 | Clear |
| EX 14 | 0 | 40 | 20 | 0 | 0 | 0 | 40 | [1]23.4 (23.3) | Slightly hazy |
| EX 15 | 0 | 36 | 24 | 0 | 0 | 0 | 40 | [1]23.2 | Hazy, a little phase separation |
| EX 16 | 0 | 30 | 30 | 0 | 0 | 0 | 40 | [1]24.1 | Hazier & a little more phase separation vs EX 16 |
| EX 17 | 0 | 20 | 30 | 0 | 0 | 0 | 50 | [1]23.4 | Clear |
| EX 18 | 0 | 10 | 30 | 0 | 0 | 0 | 60 | [2]23.2 | Clear |
| EX 19 | 0 | 20 | 30 | 4 | 0 | 0 | 46 | [1]23.7 | Clear |
| EX 20 | 0 | 20 | 30 | 0 | 4 | 0 | 46 | [1]25.7 | Very hazy, foamy, viscous, lightly colored |
| EX 26 | 68 | 0 | 22 | 0 | 0 | 10 | 0 | [1]20.2 | Slightly hazy but no separation |

**Surface tension in parentheses measured in organic solvent as per "Surface Tension Determination"

[1]The aqueous solution used for surface tension measurement was clear.
[2]The aqueous solution used for surface tension measurement was slightly hazy.
[3]The aqueous solution used for surface tension measurement was hazy.
[4]The aqueous solution used for surface tension was very hazy.

Selected examples were evaluated for molecular weight by gel permeation chromatography (GPC). The results are shown in Table 2.

TABLE 2

| Example | Mw | Mn | Mw/Mn |
|---|---|---|---|
| EX5 | 3194 | 2481 | 1.29 |
| EX6 | 3517 | 2685 | 1.31 |
| EX19 | 3736 | 2491 | 1.50 |
| EX11 | 2650 | 2410 | 1.10 |

Resin Based Coating Solutions

Several different example compositions were mixed at 0.3% wt % with various different resins to determine the value of these novel compositions in improving the wetting of paints and coatings. Surface tension values were measured as described above except that the surface tensions of the compositions in Resin 1, an aqueous colloidal dispersion of aromatic urethane obtained from DSM NeoResins, the Netherlands, under the trade designation "NEOREZ R-941", and Resins 2, 3, and 4, acrylic emulsions, commercially available from BASF, Sturtevant, Wis., under the trade designations "JONCRYL 1972", "JONCRYL 1532", and "JONCRYL 537", respectively, were measured. The results indicate that the novel surfactant compositions significantly improved the surface tensions and thus the expected wetting properties of the resins.

TABLE 3

| Example composition | Resin | Surface tension (dyn/cm) |
|---|---|---|
| None added | Resin 1 | 43.2 |
| EX5 | Resin 1 | 28.7 |
| EX11 | Resin 1 | 34.8 |
| EX19 | Resin 1 | 30.0 |
| EX5 | Resin 2 | 35.2 |
| EX19 | Resin 2 | 35.0 |
| EX5 | Resin 3 | 34.8 |
| EX11 | Resin 3 | 37.2 |
| EX19 | Resin 3 | 34.4 |
| EX5 | Resin 4 | 30.9 |
| EX11 | Resin 4 | 36.1 |
| EX19 | Resin 4 | 33.9 |

Core Flood Examples

Examples 11 and 19 in solvent were tested according to the "Core Flood Evaluation" to demonstrate the method of treating a hydrocarbon-bearing formation disclosed herein. The results are shown in Table 4.

For the Example 19 composition, which was present with a small amount of acrylic acid monomer, a core flood evaluation was also run with Texas Cream limestone. Since the limestone has relatively low permeability compared to the Berea sandstone, only about 8 pore volumes of the treatment solution were injected at an injection rate of 0.5 mL/minute, compared to 2 mL/minute injection rate for the sandstone. Multiple flow rates of gas condensate were run before and after the treatment. The results from the evaluation of the Example 19 composition on Texas Cream Limestone are shown in Table 5.

TABLE 4

| *Composition | | EX11 | EX19 |
|---|---|---|---|
| Pre-Treatment | Absolute Permeability, mD | 108 | 154 |
| | Total Core Flow Rate (cc/hr) | 516 | 541 |
| | $K_r^g$ | 3.17% | 3.37% |
| | $K_r^o$ | 0.94% | 0.98% |
| Post-treatment | Total Core Flow Rate (cc/hr) | 519 | 538 |
| | $K_r^g$ | 9.24% | 6.54% |
| | $K_r^o$ | 2.73% | 1.91% |
| Improvement Ratio | Gas | 2.92 | 1.94 |
| | Oil | 2.91 | 1.94 |

TABLE 5

| EX19 (Absolute Permeability = 7 mD) | | | | | |
|---|---|---|---|---|---|
| Flow Rate | $Q_{PUMP}$, cc/hr | 15 | 30 | 45 | 60 |
| Pre-Treatment | Total Core Flow Rate, cc/hr | 44 | 86 | 128 | 169 |
| | Rel. Gas Permeability, $K_r^g$ | 4.3% | 4.5% | 4.8% | 4.8% |
| | Rel. Oil Permeability, $K_r^o$ | 1.3% | 1.3% | 1.4% | 1.4% |
| Post-treatment | Total Core Flow Rate, cc/hr | 44 | 87 | 131 | 173 |
| | Rel. Gas Permeability, $K_r^g$ | 10.5% | 12.0% | 10.8% | 11.1% |
| | Rel. Oil Permeability, $K_r^o$ | 3.1% | 3.5% | 3.2% | 3.3% |
| Improvement Ratio | Gas | 2.44 | 2.68 | 2.26 | 2.31 |
| | Oil | 2.43 | 2.67 | 2.25 | 2.31 |

Examples 27 to 30

Examples 27 to 30 were made on the same scale as Example 1 but with the formulations as shown in Table 6. Note that for convenience the relative weight ratios in Table 6 exclude initiator and MPD. However, the amounts of these were the same in these examples as in Example 1.

TABLE 6

| EX | S2 | MeFBSEA | PEG 400 A |
|---|---|---|---|
| EX 27 | 75 | 5 | 20 |
| EX 28 | 80 | 10 | 10 |
| EX 29 | 70 | 10 | 20 |

Surface tensions for Examples 27 to 29 were measured at different concentrations in water using the test method described above. The results are shown in Table 7, below.

TABLE 7

| EX | 0 ppm | 30 ppm | 60 ppm | 125 ppm | 250 ppm | 500 ppm | 1000 ppm | 1500 ppm | 2000 ppm | 3000 ppm | 4000 ppm | 5000 ppm |
|---|---|---|---|---|---|---|---|---|---|---|---|---|
| EX 27 | 72.1 | 36.8 | 30.1 | 26.4 | 23.6 | 23.2 | 21.0 | 21.7 | 21.9 | 21.8 | 21.9 | 22.0 |
| EX 28 | 72.1 | 31.3 | 27.0 | 24.6 | 22.2 | 21.8 | 21.8 | 21.6 | 21.8 | 21.7 | 21.9 | 21.6 |
| EX 29 | 70.8 | 30.4 | 26.2 | 23.7 | 22.9 | 21.9 | 21.5 | 21.8 | 21.5 | 21.4 | 21.4 | 21.8 |

For comparison, a nonionic fluorinated polymeric surfactant was prepared according to the method described in U.S. Pat. No. 6,664,354 (Savu et al.), Example 2, Parts A and B, and Example 4, incorporated herein by reference, except using 4270 kilograms (kg) of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Example 2, Part B, and using 15.6 grams of 50/50 mineral spirits/TRIGONOX-21-C50 organic peroxide initiator (tert-butyl peroxy-2-ethylhexanoate obtained from Akzo Nobel, Arnhem, The Netherlands) in place of 2,2'-azobisisobutyronitrile, and with 9.9 grams of 1-methyl-2-pyrrolidinone added to the charges in the procedure of Example 4. Surface tension for this nonionic fluorinated polymeric surfactant was measured as is shown in Table 8, below.

TABLE 8

| 0 ppm | 30 ppm | 60 ppm | 111 ppm | 300 ppm | 470 ppm | 720 ppm | 1000 ppm | 1500 ppm | 2000 ppm | 2600 ppm |
|---|---|---|---|---|---|---|---|---|---|---|
| 72 | 30.3 | 28.0 | 25.6 | 22.0 | 21.2 | 20.8 | 20.8 | 20.3 | 19.8 | 19.7 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A composition comprising a fluorinated polymer and a non-fluorinated polymer, wherein the composition is free of pigment, wherein the fluorinated polymer comprises:

first divalent units independently represented by formula:

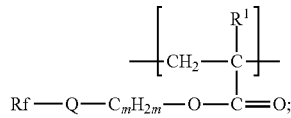

and second divalent units independently comprising a pendent cationic, anionic, amphoteric, or amine oxide group or a pendent poly(alkyleneoxy) segment;

Rf represents a fluoroalkyl group having from 1 to 8 carbon atoms or Rf represents a polyfluoroether group;

each $R^1$ is independently hydrogen or methyl;

Q is a bond, $-SO_2-N(R)-$, or $-C(O)-N(R)-$, wherein R is alkyl having from 1 to 4 carbon atoms or hydrogen; and m is an integer from 1 to 11, wherein the fluorinated polymer has not more than 2.5 percent by weight units represented by formula:

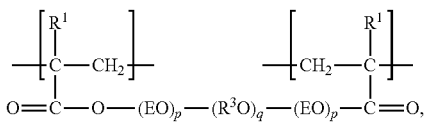

wherein the fluorinated polymer has not more than 2.5 percent by weight units represented by formula:

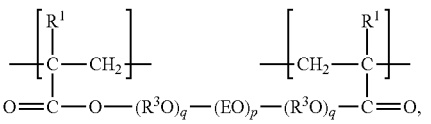

and wherein the non-fluorinated polymer is represented by formula $R^2O\text{-}(EO)_p\text{---}(R^3O)_q\text{-}(EO)_p\text{---}R^2$ or $R^2O\text{---}(R^3O)_q\text{-}(EO)_p\text{---}(R^3O)_q\text{---}R^2$, wherein $R^2$ is hydrogen or alkyl having from 1 to 4 carbon atoms;

EO represents $-CH_2CH_2O-$;

each $R^3O$ is independently selected from the group consisting of $-CH(CH_3)CH_2O-$, $-CH_2CH_2CH_2O-$, $-CH_2CH(CH_3)O-$, $-CH_2CH_2CH_2CH_2O-$, $-CH(CH_2CH_3)CH_2O-$, $-CH_2CH(CH_2CH_3)O-$, and $-CH_2C(CH_3)_2O-$;

each p is independently 1 to 150; and each q is independently 0 to 150, wherein p+q is at least 15.

2. The composition of claim 1, wherein the composition comprises at least 10 percent by weight of the non-fluorinated polymer, based on the total weight of the composition.

3. The composition of claim 1, wherein Rf represents a perfluoroalkyl group having up to 6 carbon atoms.

4. The composition of claim 1, wherein at least one of the second divalent units is represented by formula:

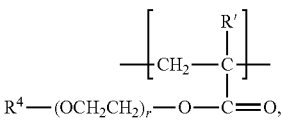

wherein each R' is independently hydrogen or methyl;

each $R^4$ is independently alkyl having from 1 to 4 carbon atoms; and r is in a range from 1 to 50.

5. The composition of claim 1, wherein at least one of the second divalent units is represented by formula:

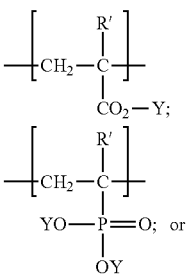

-continued

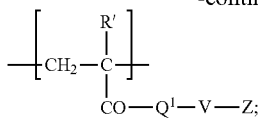

wherein
- $Q^1$ is selected from the group consisting of —O—, —S—, and —N($R^7$)—;
- each $R^7$ is independently selected from the group consisting of hydrogen and alkyl having from 1 to 4 carbon atoms;
- each R' is independently hydrogen or methyl;
- V is alkylene that is optionally interrupted by at least one ether linkage or amine linkage;
- Z is selected from the group consisting of —P(O)(OY)$_2$, —O—P(O)(OY)$_2$, —SO$_3$Y, and —CO$_2$Y; and
- each Y is independently selected from the group consisting of hydrogen and a counter cation.

6. The composition of claim 1, wherein at least one of the second divalent units is represented by formula:

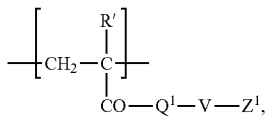

wherein
- $Q^1$ is selected from the group consisting of —O—, —S—, and —N($R^7$)—;
- each $R^7$ is independently selected from the group consisting of hydrogen and alkyl having from 1 to 4 carbon atoms;
- each R' is independently hydrogen or methyl;
- V is alkylene that is optionally interrupted by at least one ether linkage or amine linkage; and
- $Z^1$ is selected from the group consisting of —[N($R^8$)$_3$]$^+$M$^-$, —N$^+$(OY$^1$)($R^9$)$_3$, —N$^+$($R^8$)$_2$—(CH$_2$)$_g$—SO$_3$Y$^1$, and —N$^+$($R^8$)$_2$—(CH$_2$)$_g$—CO$_2$Y$^1$, wherein
- each $R^8$ is independently selected from the group consisting of hydrogen and alkyl having from 1 to 6 carbon atoms;
- each $R^9$ is independently selected from the group consisting of hydrogen and alkyl having from 1 to 6 carbon atoms, wherein alkyl is optionally substituted by at least one halogen, alkoxy, nitro, or nitrile group, or two $R^9$ groups may join to form a 5- to 7-membered ring optionally containing at least one O, N, or S and optionally substituted by alkyl having 1 to 6 carbon atoms;
- each g is independently an integer from 2 to 6;
- M$^-$ is a counter anion; and
- $Y^1$ is selected from the group consisting of hydrogen and a free anion.

7. The composition of claim 1, wherein the pendent poly(alkyleneoxy) segment has a number average molecular weight of up to 1000 grams per mole, and wherein the non-fluorinated polymer has a number average molecular weight of greater than 1000 grams per mole.

8. The composition of claim 1, wherein the composition is essentially free of volatile organic solvent.

9. The composition of claim 1, further comprising a grafted polymer comprising the non-fluorinated polymer and the fluorinated polymer grafted together.

10. The composition of claim 1, wherein each $R^2$ is hydrogen.

11. A method of making the composition of claim 1, the method comprising:
combining components comprising a fluorinated monomer represented by formula Rf-Q-C$_m$H$_{2m}$—O—C(O)—C($R^1$)=CH$_2$, a second monomer having a pendent cationic, anionic, amphoteric, or amine-oxide group or a pendent poly(alkyleneoxy) segment, a non-fluorinated polymer represented by formula $R^2$O-(EO)$_p$—($R^3$O)$_q$-(EO)$_p$—$R^2$ or $R^2$O—($R^3$O)$_q$-(EO)$_p$—($R^3$O)$_q$—$R^2$, a free-radical initiator, not more than 2.5 percent by weight of a monomer represented by formula CH$_2$=C($R^1$)—C(O)—O-(EO)$_p$—($R^3$O)$_q$-(EO)$_p$—C(O)—C($R^1$)=CH$_2$ based on the total weight of the monomers, and not more than 2.5 percent by weight of a monomer represented by formula CH$_2$=C($R^1$)—C(O)—O—($R^3$O)$_q$-(EO)$_p$—($R^3$O)$_q$—C(O)—C($R^1$)=CH$_2$, based on the total weight of the monomers;
wherein
- Rf represents a fluoroalkyl group having from 1 to 8 carbon atoms or Rf represents a polyfluoroether group;
- each $R^1$ is independently hydrogen or methyl;
- Q is a bond, —SO$_2$—N(R)—, or —C(O)—N(R)—, wherein R is alkyl having from 1 to 4 carbon atoms or hydrogen;
- m is an integer from 1 to 11,
- EO represents —CH$_2$CH$_2$O—;
- each $R^3$O is independently selected from the group consisting of —CH(CH$_3$)CH$_2$O—, —CH$_2$CH$_2$CH$_2$O—, —CH$_2$CH(CH$_3$)O—, —CH$_2$CH$_2$CH$_2$CH$_2$O—, —CH(CH$_2$CH$_3$)CH$_2$O—, —CH$_2$CH(CH$_2$CH$_3$)O—, and —CH$_2$C(CH$_3$)$_2$O—;
- each p is independently 1 to 150; and
- each q is independently 0 to 150, wherein p+q is at least 15, and
- $R^2$ is hydrogen or alkyl having from 1 to 4 carbon atoms; and
copolymerizing the fluorinated monomer and the second monomer.

12. The method of claim 11, wherein the components combined are essentially free of volatile organic solvent.

13. The method of claim 11, wherein the components comprise at least 10 percent by weight of the non-fluorinated polymer, based on the total weight of the components.

14. A method of reducing the surface tension of a liquid, the method comprising combining the liquid with the composition of claim 1 to reduce the surface tension of the liquid.

15. A method of treating a hydrocarbon-bearing formation, the method comprising contacting the hydrocarbon-bearing formation with a treatment composition comprising solvent and the composition of claim 1.

16. The method of claim 15, wherein the hydrocarbon-bearing formation comprises at least one of limestone, dolomite, sandstone, shale, conglomerate, diatomite, or sand.

17. The method of claim 15, wherein the hydrocarbon-bearing formation has at least one fracture, and wherein the fracture has a plurality of proppants therein.

18. The method of claim 15, wherein the solvent comprises at least one of water, a polyol, a polyol ether, an alcohol, an ether, or a ketone, wherein the alcohol, ether, and ketone each independently have up to 4 carbon atoms, and wherein the polyol or polyol ether each independently have from 2 to 25 carbon atoms.

19. A plurality of proppants treated with the composition of claim 1.

20. The composition of claim 1, wherein Q is —SO$_2$N(R)—.

* * * * *